(12) United States Patent
Krishnan et al.

(10) Patent No.: US 12,136,723 B2
(45) Date of Patent: *Nov. 5, 2024

(54) MIST ELIMINATION SYSTEM FOR ELECTROCHEMICAL CELLS

(71) Applicant: FORM ENERGY, INC., Somerville, MA (US)

(72) Inventors: Ramkumar Krishnan, Scottsdale, AZ (US); Joel Hayes, Chandler, AZ (US); Scott Klug, Mesa, AZ (US); Patrick Samuleson, Phoenix, AZ (US); Craig Trzebny, Phoenix, AZ (US)

(73) Assignee: FORM ENERGY, INC., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,054

(22) Filed: Jan. 10, 2022

(65) Prior Publication Data

US 2022/0131213 A1 Apr. 28, 2022

Related U.S. Application Data

(63) Continuation of application No. 16/318,560, filed as application No. PCT/US2017/043500 on Jul. 24, 2017, now Pat. No. 11,228,066.

(Continued)

(51) Int. Cl.
*H01M 12/02* (2006.01)
*H01M 12/06* (2006.01)
(Continued)

(52) U.S. Cl.
CPC ........... *H01M 12/02* (2013.01); *H01M 12/06* (2013.01); *H01M 12/08* (2013.01); *H01M 50/35* (2021.01);
(Continued)

(58) Field of Classification Search
None
See application file for complete search history.

(56) References Cited

U.S. PATENT DOCUMENTS

| 2,083,364 A | 6/1937 | Cook, Jr. et al. |
| 2,643,276 A | 6/1953 | Salauze |

(Continued)

FOREIGN PATENT DOCUMENTS

| CN | 1233861 A | 11/1999 |
| CN | 1535489 A | 10/2004 |

(Continued)

OTHER PUBLICATIONS

Office Action dated May 7, 2021, issued in corresponding Chinese Patent Application No. 201780034966.9, with English translation (23 pgs.).

(Continued)

*Primary Examiner* — Jonathan Crepeau
(74) *Attorney, Agent, or Firm* — The Marbury Law Group, PLLC

(57) ABSTRACT

An electrochemical cell includes a mist elimination system that prevents mist from escaping from the cell chamber and conserves moisture within the cell. An exemplary mist elimination system includes a spill prevention device that reduces or prevents an electrolyte from escaping from the cell chamber in the event of an upset, wherein the electrochemical cell is tipped over. A mist elimination system includes a recombination portion that reacts with hydrogen to produce water, that may be reintroduced into the cell chamber. A mist elimination system includes a neutralizer portion that reacts with an electrolyte to bring the pH closer to neutral, as acid/base reaction. A mist elimination system includes a filter that captures mist that may be reintroduced into the cell chamber. A mist elimination system includes a (Continued)

hydrophobic filter on the outer surface to prevent water and other liquids from entering into the mist elimination system.

18 Claims, 7 Drawing Sheets

Related U.S. Application Data

(60) Provisional application No. 62/365,924, filed on Jul. 22, 2016.

(51) Int. Cl.
| | |
|---|---|
| H01M 12/08 | (2006.01) |
| H01M 50/30 | (2021.01) |
| H01M 50/35 | (2021.01) |
| H01M 50/367 | (2021.01) |
| H01M 50/392 | (2021.01) |

(52) U.S. Cl.
CPC ....... *H01M 50/367* (2021.01); *H01M 50/392* (2021.01); *H01M 50/394* (2021.01); *Y02E 60/10* (2013.01)

(56) References Cited

U.S. PATENT DOCUMENTS

| | | |
|---|---|---|
| 2,683,182 A | 7/1954 | Salauze |
| 3,219,486 A | 11/1965 | Salcedo et al. |
| 3,223,611 A | 12/1965 | Kergan et al. |
| 3,329,530 A | 7/1967 | Kometani et al. |
| 3,338,746 A | 8/1967 | Heinz et al. |
| 3,363,570 A | 1/1968 | Scott |
| 3,415,689 A | 12/1968 | Carson et al. |
| 3,483,036 A | 12/1969 | Gregor |
| 3,484,291 A | 12/1969 | MacKenzie, Jr. et al. |
| 3,489,610 A | 1/1970 | Berger et al. |
| 3,525,643 A | 8/1970 | Spahrbier et al. |
| 3,532,548 A | 10/1970 | Stachurski |
| 3,615,843 A | 10/1971 | Moran |
| 3,615,844 A | 10/1971 | Spengler |
| 3,650,837 A | 3/1972 | Palmer |
| 3,686,225 A | 8/1972 | Pedersen |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley |
| 3,785,868 A | 1/1974 | Devitt |
| 3,801,376 A | 4/1974 | Lindstrom |
| 3,822,149 A | 7/1974 | Hale |
| 3,840,455 A | 10/1974 | Cooley et al. |
| 3,847,603 A | 11/1974 | Fukuda et al. |
| 3,850,696 A | 11/1974 | Summers et al. |
| 3,886,426 A | 5/1975 | Daggett et al. |
| 3,888,877 A | 6/1975 | Lehn et al. |
| 3,902,916 A | 9/1975 | Warszawski |
| 3,919,062 A | 11/1975 | Lundquist, Jr. et al. |
| 3,945,849 A | 3/1976 | Hoffman |
| 3,947,292 A | 3/1976 | Jackovitz et al. |
| 3,965,116 A | 6/1976 | Cram |
| 3,966,766 A | 6/1976 | Lehn |
| 3,972,727 A | 8/1976 | Cohn |
| 4,001,212 A | 1/1977 | Richman |
| 4,001,279 A | 1/1977 | Cram |
| 4,007,059 A | 2/1977 | Witherspoon et al. |
| 4,054,725 A | 10/1977 | Tuburaya |
| 4,076,600 A | 2/1978 | Huebner |
| 4,117,205 A | 9/1978 | Kitai |
| 4,119,772 A | 10/1978 | Peters et al. |
| 4,132,837 A | 1/1979 | Soffer |
| 4,139,679 A | 2/1979 | Appleby et al. |
| 4,168,349 A | 9/1979 | Buzzelli |
| 4,201,653 A | 5/1980 | O'Neill et al. |
| 4,246,324 A | 1/1981 | De et al. |
| 4,250,236 A | 2/1981 | Haschka et al. |
| 4,265,789 A | 5/1981 | Christopherson et al. |
| 4,312,927 A | 1/1982 | Salmon |
| 4,317,863 A | 3/1982 | Struthers |
| 4,331,460 A | 5/1982 | Dillmann et al. |
| 4,336,043 A | 6/1982 | Aonuma et al. |
| 4,340,449 A | 7/1982 | Srinivasan et al. |
| 4,369,235 A | 1/1983 | Bursell |
| 4,375,427 A | 3/1983 | Miller et al. |
| 4,384,928 A | 5/1983 | Hall |
| 4,385,101 A | 5/1983 | Catanzarite |
| 4,385,967 A | 5/1983 | Brady et al. |
| 4,386,141 A | 5/1983 | Weidner et al. |
| 4,447,504 A | 5/1984 | Goebel |
| 4,448,858 A | 5/1984 | Graf et al. |
| 4,450,211 A | 5/1984 | Vignaud |
| 4,461,817 A | 7/1984 | Itoh et al. |
| 4,479,856 A | 10/1984 | Ando |
| 4,484,936 A | 11/1984 | Sakai |
| 4,485,154 A | 11/1984 | Remick et al. |
| 4,487,818 A | 12/1984 | Ovshinsky et al. |
| 4,521,497 A | 6/1985 | Tamminen |
| 4,535,039 A | 8/1985 | Naarmann et al. |
| 4,552,630 A | 11/1985 | Wheeler et al. |
| 4,581,064 A | 4/1986 | Morrison et al. |
| 4,585,710 A | 4/1986 | McEvoy |
| 4,605,626 A | 8/1986 | Beck |
| 4,670,363 A | 6/1987 | Whitney et al. |
| 4,684,585 A | 8/1987 | Tamminen |
| 4,693,946 A | 9/1987 | Niksa et al. |
| 4,732,823 A | 3/1988 | Ito et al. |
| 4,765,799 A | 8/1988 | Waldrop |
| 4,828,942 A | 5/1989 | Licht |
| 4,842,963 A | 6/1989 | Ross, Jr. |
| 4,869,979 A | 9/1989 | Ohtani et al. |
| 4,871,627 A | 10/1989 | Strong et al. |
| 4,894,355 A | 1/1990 | Takeuchi et al. |
| 4,952,289 A | 8/1990 | Ciccone et al. |
| 4,977,044 A | 12/1990 | Ludwig |
| 5,009,755 A | 4/1991 | Shor |
| 5,011,747 A | 4/1991 | Strong et al. |
| 5,041,194 A | 8/1991 | Mori et al. |
| 5,093,213 A | 3/1992 | O'Callaghan |
| 5,104,497 A | 4/1992 | Tetzlaff et al. |
| 5,130,211 A | 7/1992 | Wilkinson et al. |
| 5,131,387 A | 7/1992 | French et al. |
| 5,145,752 A | 9/1992 | Goldstein et al. |
| 5,185,218 A | 2/1993 | Brokman et al. |
| 5,188,914 A | 2/1993 | Blomgren et al. |
| 5,190,833 A | 3/1993 | Goldstein et al. |
| 5,200,057 A | 4/1993 | Canaris |
| 5,242,763 A | 9/1993 | Konishi et al. |
| 5,242,765 A | 9/1993 | Naimer et al. |
| 5,284,176 A | 2/1994 | Campau |
| 5,318,861 A | 6/1994 | Harats et al. |
| 5,376,471 A | 12/1994 | Hunter et al. |
| 5,397,532 A | 3/1995 | Blaimschein |
| 5,411,815 A | 5/1995 | Goldstein |
| 5,415,949 A | 5/1995 | Stone et al. |
| 5,419,987 A | 5/1995 | Goldstein et al. |
| 5,431,823 A | 7/1995 | Gofer |
| 5,432,022 A | 7/1995 | Cheiky |
| 5,434,020 A | 7/1995 | Cooper |
| 5,439,758 A | 8/1995 | Stone et al. |
| 5,441,820 A | 8/1995 | Siu et al. |
| 5,445,724 A | 8/1995 | Burkhart et al. |
| 5,451,475 A | 9/1995 | Ohta et al. |
| 5,453,334 A | 9/1995 | Melichar |
| 5,458,988 A | 10/1995 | Putt |
| 5,506,067 A | 4/1996 | Tinker |
| 5,512,391 A | 4/1996 | Fleisher |
| 5,549,991 A | 8/1996 | Licht et al. |
| 5,567,540 A | 10/1996 | Stone et al. |
| 5,569,551 A | 10/1996 | Pedicini et al. |
| 5,569,560 A | 10/1996 | Olsen et al. |
| 5,595,949 A | 1/1997 | Goldstein et al. |
| 5,645,952 A | 7/1997 | Lampinen et al. |
| 5,650,240 A | 7/1997 | Rogers |
| 5,652,068 A | 7/1997 | Shuster et al. |
| 5,665,481 A | 9/1997 | Shuster et al. |

(56) References Cited

U.S. PATENT DOCUMENTS

| | | |
|---|---|---|
| 5,700,596 A | 12/1997 | Ikoma et al. |
| 5,707,757 A | 1/1998 | Lee |
| 5,712,061 A | 1/1998 | Spak et al. |
| 5,716,726 A | 2/1998 | Cheiky |
| 5,731,105 A | 3/1998 | Fleischer et al. |
| 5,733,667 A | 3/1998 | Nakasuji et al. |
| 5,788,943 A | 8/1998 | Aladjov |
| 5,789,585 A | 8/1998 | Lee et al. |
| 5,840,443 A | 11/1998 | Gregg et al. |
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,972,531 A | 10/1999 | Kawakami |
| 5,990,352 A | 11/1999 | Nobori et al. |
| 5,998,967 A | 12/1999 | Umeki et al. |
| 6,014,013 A | 1/2000 | Suppanz et al. |
| 6,025,696 A | 2/2000 | Lenhart et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,120,941 A | 9/2000 | Lee et al. |
| 6,127,061 A | 10/2000 | Shun et al. |
| 6,153,328 A | 11/2000 | Colborn |
| 6,162,333 A | 12/2000 | Lemon et al. |
| 6,162,555 A | 12/2000 | Gutierrez et al. |
| 6,164,309 A | 12/2000 | Brecht |
| 6,165,638 A | 12/2000 | Spillman et al. |
| 6,194,098 B1 | 2/2001 | Ying et al. |
| 6,207,037 B1 | 3/2001 | Dartnell et al. |
| 6,210,832 B1 | 4/2001 | Visco et al. |
| 6,211,650 B1 | 4/2001 | Mumaw et al. |
| 6,228,535 B1 | 5/2001 | Fierro et al. |
| 6,249,940 B1 | 6/2001 | Asano et al. |
| 6,265,846 B1 | 7/2001 | Flechsig et al. |
| 6,268,085 B1 | 7/2001 | Manthiram et al. |
| 6,271,646 B1 | 8/2001 | Evers et al. |
| 6,277,508 B1 | 8/2001 | Reiser et al. |
| 6,300,015 B1 | 10/2001 | Nishiyama et al. |
| 6,312,846 B1 | 11/2001 | Marsh |
| 6,355,369 B1 | 3/2002 | Jarochenko et al. |
| 6,358,643 B1 | 3/2002 | Katz et al. |
| 6,368,741 B1 | 4/2002 | Hackel et al. |
| 6,371,995 B1 | 4/2002 | Yasunami |
| 6,379,828 B1 | 4/2002 | Worth |
| 6,383,673 B1 | 5/2002 | Faris et al. |
| 6,383,675 B1 | 5/2002 | Zhong |
| 6,410,174 B1 | 6/2002 | Faris |
| 6,416,649 B1 | 7/2002 | Ray et al. |
| 6,436,576 B1 | 8/2002 | Hossain |
| 6,458,480 B1 | 10/2002 | Morris et al. |
| 6,465,638 B2 | 10/2002 | Gorman et al. |
| 6,465,643 B1 | 10/2002 | Schiemenz et al. |
| 6,472,093 B2 | 10/2002 | Faris et al. |
| 6,475,658 B1 | 11/2002 | Pedicini et al. |
| 6,537,701 B1 | 3/2003 | Nimon et al. |
| 6,541,151 B2 | 4/2003 | Minamiura et al. |
| 6,541,941 B2 | 4/2003 | Adams et al. |
| 6,544,678 B2 | 4/2003 | Faris et al. |
| 6,558,830 B2 | 5/2003 | Faris et al. |
| 6,562,494 B1 | 5/2003 | Tsai et al. |
| 6,562,504 B2 | 5/2003 | Faris et al. |
| 6,566,000 B1 | 5/2003 | Iarochenko et al. |
| 6,569,555 B1 | 5/2003 | Faris et al. |
| 6,579,637 B1 | 6/2003 | Savage et al. |
| 6,586,909 B1 | 7/2003 | Trepka |
| 6,641,943 B1 | 11/2003 | Faris et al. |
| 6,645,904 B2 | 11/2003 | Schiemenz et al. |
| 6,646,418 B1 | 11/2003 | Xie et al. |
| 6,649,294 B2 | 11/2003 | Faris et al. |
| 6,653,252 B2 | 11/2003 | Kawahara |
| 6,666,909 B1 | 12/2003 | TeGrotenhuis et al. |
| 6,673,490 B2 | 1/2004 | Miki et al. |
| 6,677,077 B2 | 1/2004 | Spillman et al. |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,776,929 B2 | 8/2004 | Hossan et al. |
| 6,786,226 B2 | 9/2004 | Crook et al. |
| 6,787,260 B2 | 9/2004 | Smedley |
| 6,790,265 B2 | 9/2004 | Joshi et al. |
| 6,802,946 B2 | 10/2004 | Basol et al. |
| 6,811,819 B2 | 11/2004 | Joshi et al. |
| 6,811,903 B2 | 11/2004 | Vartak et al. |
| 6,822,423 B2 | 11/2004 | Yau et al. |
| 6,838,203 B2 | 1/2005 | Zheng |
| 6,849,172 B2 | 2/2005 | Rigby et al. |
| 6,849,356 B2 | 2/2005 | Dow et al. |
| 6,855,455 B1 | 2/2005 | Berger et al. |
| 6,858,347 B2 | 2/2005 | Tanigawa et al. |
| 6,866,950 B2 | 3/2005 | Connor et al. |
| 6,899,974 B2 | 5/2005 | Kamisuki et al. |
| 6,902,602 B2 | 6/2005 | Keefer et al. |
| 6,911,274 B1 | 6/2005 | Colborn et al. |
| 6,942,105 B2 | 9/2005 | Smedley et al. |
| 6,949,310 B2 | 9/2005 | Phillips |
| 6,962,992 B2 | 11/2005 | Martin et al. |
| 6,967,064 B2 | 11/2005 | Haltiner, Jr. et al. |
| 6,986,964 B2 | 1/2006 | Faris |
| 7,020,355 B2 | 3/2006 | Lahann et al. |
| 7,040,431 B2 | 5/2006 | Tartamella et al. |
| 7,060,388 B2 | 6/2006 | Naruoka |
| 7,126,310 B1 | 6/2006 | Barron |
| 7,070,632 B1 | 7/2006 | Visco |
| 7,150,933 B1 | 12/2006 | McLean |
| 7,201,857 B2 | 4/2007 | Ovshinsky et al. |
| 7,226,676 B2 | 6/2007 | Faris et al. |
| 7,238,440 B2 | 7/2007 | Damore et al. |
| 7,252,898 B2 | 7/2007 | Markoski et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,285,362 B2 | 10/2007 | Harrup et al. |
| 7,291,186 B2 | 11/2007 | Zhang |
| 7,303,835 B2 | 12/2007 | Mathias et al. |
| 7,466,104 B2 | 12/2008 | Wang et al. |
| 7,468,221 B2 | 12/2008 | LaFollette et al. |
| 7,482,081 B2 | 1/2009 | Hong |
| 7,488,547 B1 | 2/2009 | Iacovelli |
| 7,535,199 B2 | 5/2009 | Kimura et al. |
| 7,556,056 B2 | 7/2009 | Hutchinson |
| 7,598,796 B2 | 10/2009 | Mizuno et al. |
| 7,670,575 B2 | 3/2010 | Jarvinen et al. |
| 7,670,705 B2 | 3/2010 | Ueda et al. |
| 7,670,724 B1 | 3/2010 | Chan et al. |
| 7,722,988 B2 | 5/2010 | Webber |
| 7,794,582 B1 | 9/2010 | Cook et al. |
| 7,964,300 B2 | 6/2011 | Nakazawa et al. |
| 7,997,425 B2 | 8/2011 | Golden et al. |
| 8,058,165 B2 | 11/2011 | Kawano et al. |
| 8,168,337 B2 | 5/2012 | Friesen et al. |
| 8,206,469 B2 | 6/2012 | Chiang et al. |
| 8,309,259 B2 | 11/2012 | Friesen et al. |
| 8,329,346 B2 | 12/2012 | Janse et al. |
| 8,397,508 B2 | 3/2013 | Weimer et al. |
| 8,481,207 B2 | 7/2013 | Friesen et al. |
| 8,491,763 B2 | 7/2013 | Friesen |
| 8,492,052 B2 | 7/2013 | Friesen |
| 8,632,921 B2 | 1/2014 | Friesen et al. |
| 8,659,268 B2 | 2/2014 | Krishnan et al. |
| 8,758,948 B2 | 6/2014 | Narayan et al. |
| 8,877,391 B2 | 11/2014 | Friesen et al. |
| 8,895,197 B2 | 11/2014 | Friesen et al. |
| 8,906,563 B2 | 12/2014 | Friesen et al. |
| 8,911,910 B2 | 12/2014 | Krishnan et al. |
| 9,065,120 B2 | 6/2015 | Carlson et al. |
| 9,105,910 B2 | 8/2015 | Friesen et al. |
| 9,105,946 B2 | 8/2015 | Friesen et al. |
| 9,172,123 B2 | 10/2015 | Albertus et al. |

(56) References Cited

U.S. PATENT DOCUMENTS

| | | |
|---|---|---|
| 9,178,207 B2 | 11/2015 | Friesen et al. |
| 9,214,708 B2 | 12/2015 | Friesen |
| 9,263,779 B2 | 2/2016 | Lee et al. |
| 9,269,995 B2 | 2/2016 | Friesen et al. |
| 9,269,996 B2 | 2/2016 | Friesen |
| 9,269,998 B2 | 2/2016 | Hayes et al. |
| 9,368,486 B2 | 6/2016 | Wang et al. |
| 9,368,788 B2 | 6/2016 | Ogg et al. |
| 9,419,273 B2 | 8/2016 | Kakeya et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins et al. |
| 9,680,154 B2 | 6/2017 | Chen et al. |
| 9,780,379 B2 | 10/2017 | Zhamu et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,947,481 B2 | 4/2018 | Solomon et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,426 B2 | 1/2019 | Nitta |
| 10,302,320 B2 | 5/2019 | Howard |
| 10,530,001 B2 | 1/2020 | Finkelshtain et al. |
| 11,228,066 B2 * | 1/2022 | Krishnan ............. H01M 12/06 |
| 11,611,115 B2 | 3/2023 | Pham et al. |
| 2001/0007725 A1 | 7/2001 | Faris et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma et al. |
| 2002/0155351 A1 | 10/2002 | Licht |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0029723 A1 | 2/2004 | Schiemenz et al. |
| 2004/0031251 A1 | 2/2004 | Priess |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0086779 A1 | 5/2004 | Higley et al. |
| 2004/0104124 A1 | 6/2004 | Cobley et al. |
| 2004/0110049 A1 | 6/2004 | Shimotori et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0084737 A1 | 4/2005 | Wine et al. |
| 2005/0105229 A1 | 5/2005 | Deng et al. |
| 2005/0123815 A1 | 6/2005 | Tsai et al. |
| 2005/0142398 A1 | 6/2005 | Browall et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | LaFollette et al. |
| 2006/0039853 A1 | 2/2006 | Fan et al. |
| 2006/0040174 A1 | 2/2006 | Peabody |
| 2006/0076295 A1 | 4/2006 | Leonard et al. |
| 2006/0107639 A1 | 5/2006 | Hamlin et al. |
| 2006/0127731 A1 | 6/2006 | Faris |
| 2006/0175720 A1 | 8/2006 | Kerfoot |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0281000 A1 | 12/2006 | Hayashigawa |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0092787 A1 | 4/2007 | Wang et al. |
| 2007/0099037 A1 | 5/2007 | Senner |
| 2007/0120091 A1 | 5/2007 | Ovshinsky et al. |
| 2007/0134527 A1 | 6/2007 | Desouza et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami et al. |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner, Jr. et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0283811 A1 | 12/2007 | Wu |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0118826 A1 | 5/2008 | Shimamura et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin et al. |
| 2008/0268341 A1 | 10/2008 | Zhang |
| 2009/0018668 A1 | 1/2009 | Galbraith |
| 2009/0027006 A1 | 1/2009 | Vezzini et al. |
| 2009/0081488 A1 | 3/2009 | Sato et al. |
| 2009/0087700 A1 | 4/2009 | Carlisle et al. |
| 2009/0117429 A1 | 5/2009 | Zillmer et al. |
| 2009/0163394 A1 | 6/2009 | Muraishi et al. |
| 2009/0167242 A1 | 7/2009 | Naganuma et al. |
| 2009/0230921 A1 | 9/2009 | Hsu et al. |
| 2009/0233153 A1 | 9/2009 | Carlisle et al. |
| 2009/0239131 A1 | 9/2009 | Winter |
| 2009/0239132 A1 | 9/2009 | Johnson |
| 2009/0284229 A1 | 11/2009 | Friesen et al. |
| 2009/0286149 A1 | 11/2009 | Ci et al. |
| 2009/0305090 A1 | 12/2009 | Chuang |

(56) References Cited

U.S. PATENT DOCUMENTS

| | | |
|---|---|---|
| 2010/0003570 A1 | 1/2010 | Finsterwalder et al. |
| 2010/0055508 A1 | 3/2010 | Renn |
| 2010/0062303 A1 | 3/2010 | Bae et al. |
| 2010/0062313 A1 | 3/2010 | Browning et al. |
| 2010/0119895 A1 | 5/2010 | Friesen |
| 2010/0119956 A1 | 5/2010 | Tokuda et al. |
| 2010/0196768 A1 | 8/2010 | Roberts et al. |
| 2010/0261272 A1 | 10/2010 | Chalmers et al. |
| 2010/0266907 A1 | 10/2010 | Yazami |
| 2010/0285375 A1 | 11/2010 | Friesen et al. |
| 2010/0310905 A1 | 12/2010 | Oriet et al. |
| 2010/0310947 A1 | 12/2010 | Rich et al. |
| 2010/0316935 A1 | 12/2010 | Friesen et al. |
| 2011/0023428 A1 | 2/2011 | Ziebold et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0045325 A1 | 2/2011 | Anzai et al. |
| 2011/0059355 A1 | 3/2011 | Zhang et al. |
| 2011/0070481 A1 | 3/2011 | Liang et al. |
| 2011/0070506 A1 | 3/2011 | Friesen et al. |
| 2011/0086278 A1 | 4/2011 | Friesen et al. |
| 2011/0111314 A1 | 5/2011 | Cui et al. |
| 2011/0143219 A1 | 6/2011 | Weiss et al. |
| 2011/0189551 A1 | 8/2011 | Friesen et al. |
| 2011/0200893 A1 | 8/2011 | Friesen et al. |
| 2011/0236730 A1 | 9/2011 | Jones |
| 2011/0250512 A1 | 10/2011 | Friesen et al. |
| 2011/0281184 A1 | 11/2011 | Friesen et al. |
| 2011/0305959 A1 | 12/2011 | Friesen et al. |
| 2011/0316485 A1 | 12/2011 | Krishnan et al. |
| 2012/0009491 A1 | 1/2012 | Friesen et al. |
| 2012/0015264 A1 | 1/2012 | Friesen et al. |
| 2012/0021303 A1 | 1/2012 | Amendola et al. |
| 2012/0034536 A1 | 2/2012 | Isom et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0139496 A1 | 6/2012 | Krishnan et al. |
| 2012/0187918 A1 | 7/2012 | Narayan et al. |
| 2012/0193224 A1 | 8/2012 | Suk |
| 2012/0193242 A1 | 8/2012 | Marchal |
| 2012/0202127 A1 | 8/2012 | Friesen et al. |
| 2012/0237838 A1 | 9/2012 | Uesaka |
| 2012/0295172 A1 | 11/2012 | Peled et al. |
| 2012/0321969 A1 | 12/2012 | Friesen et al. |
| 2012/0321970 A1 | 12/2012 | Friesen et al. |
| 2013/0022881 A1 | 1/2013 | Friesen et al. |
| 2013/0095393 A1 | 4/2013 | Friesen et al. |
| 2013/0106359 A1 | 5/2013 | Noda et al. |
| 2013/0115523 A1 | 5/2013 | Friesen et al. |
| 2013/0115525 A1 | 5/2013 | Friensen et al. |
| 2013/0115526 A1 | 5/2013 | Friesen et al. |
| 2013/0115531 A1 | 5/2013 | Amendola et al. |
| 2013/0115532 A1 | 5/2013 | Friesen et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Visco et al. |
| 2014/0091631 A1 | 4/2014 | Naden et al. |
| 2014/0162096 A1 | 6/2014 | Lex et al. |
| 2014/0162129 A1 | 6/2014 | Kim et al. |
| 2014/0191727 A1 | 7/2014 | Toussaint et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes |
| 2014/0272477 A1 | 9/2014 | West et al. |
| 2014/0342214 A1 | 11/2014 | Wegner et al. |
| 2015/0010833 A1 | 1/2015 | Amendola et al. |
| 2015/0086884 A1 | 3/2015 | Narayan et al. |
| 2015/0140360 A1 | 5/2015 | Arthur et al. |
| 2015/0140455 A1 | 5/2015 | Imano |
| 2015/0200431 A1 | 7/2015 | Martirosyan et al. |
| 2015/0295291 A1 | 10/2015 | Sata et al. |
| 2015/0303539 A1 | 10/2015 | Stevens et al. |
| 2015/0372357 A1 | 12/2015 | Kruglak et al. |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0045841 A1 | 2/2016 | Kaplan et al. |
| 2016/0111730 A1 | 4/2016 | Kim et al. |
| 2016/0118636 A1 | 4/2016 | Jin et al. |
| 2016/0248136 A1 | 8/2016 | Bugga et al. |
| 2016/0293978 A1 | 10/2016 | Krishnan et al. |
| 2016/0308220 A1 | 10/2016 | Qi et al. |
| 2017/0141434 A1 | 5/2017 | Narayan et al. |
| 2017/0170451 A1 | 6/2017 | Englert |
| 2017/0173557 A1 | 6/2017 | Olson et al. |
| 2017/0207464 A1 | 7/2017 | Gyenge et al. |
| 2017/0214265 A1 | 7/2017 | Stevens et al. |
| 2017/0271731 A1 | 9/2017 | Hayashi et al. |
| 2017/0301922 A1 | 10/2017 | Goodenough et al. |
| 2017/0352936 A1 | 12/2017 | Jin |
| 2018/0010228 A1 | 1/2018 | Ogg et al. |
| 2018/0048041 A1 | 2/2018 | Chen et al. |
| 2018/0123116 A1 | 5/2018 | Lee et al. |
| 2018/0145383 A1 | 5/2018 | Krishnan et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2018/0366799 A1 | 12/2018 | Amendola et al. |
| 2019/0006122 A1 | 1/2019 | Peled et al. |
| 2019/0006695 A1 | 1/2019 | Swiegers et al. |
| 2019/0229343 A1 | 1/2019 | Roumi et al. |
| 2019/0051908 A1 | 2/2019 | Chen et al. |
| 2019/0074536 A1 | 3/2019 | Lee et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Mahadik et al. |
| 2020/0036002 A1 | 1/2020 | Chakraborty et al. |
| 2020/0068358 A1 | 2/2020 | Macrae |
| 2020/0136153 A1 | 4/2020 | Jaramillo et al. |
| 2020/0266423 A1 | 8/2020 | Kitagawa et al. |
| 2020/0280064 A1 | 9/2020 | Takahashi et al. |
| 2020/0411879 A1 | 12/2020 | Hartman et al. |
| 2020/0411932 A1 | 12/2020 | Weber et al. |
| 2021/0013536 A1 | 1/2021 | Golden et al. |
| 2021/0028452 A1 | 1/2021 | Su et al. |
| 2021/0028457 A1 | 1/2021 | Newhouse et al. |
| 2021/0036283 A1 | 2/2021 | Børsheim et al. |
| 2021/0351425 A1 | 11/2021 | Smith et al. |

FOREIGN PATENT DOCUMENTS

| | | |
|---|---|---|
| CN | 1543685 A | 11/2004 |
| CN | 2888658 Y | 4/2007 |
| CN | 101142706 A | 3/2008 |
| CN | 102232004 A | 11/2011 |
| CN | 103003199 A | 3/2013 |
| CN | 103098299 A | 5/2013 |
| CN | 103400947 A | 11/2013 |
| CN | 103443982 A | 12/2013 |
| CN | 103515636 A | 1/2014 |
| CN | 104269570 A | 1/2015 |
| CN | 104767006 A | 7/2015 |
| CN | 106575800 A | 4/2017 |
| CN | 206340592 U | 7/2017 |
| CN | 109478653 A | 3/2019 |
| CN | 107196013 A | 6/2019 |
| DE | 1266021 B | 4/1968 |
| EP | 0037634 A1 | 10/1981 |
| EP | 0058090 A1 | 8/1982 |
| EP | 0277937 A1 | 8/1988 |
| EP | 0677883 A1 | 10/1995 |

(56) References Cited

FOREIGN PATENT DOCUMENTS

| | | |
|---|---|---|
| EP | 0598144 B1 | 10/1996 |
| EP | 0637291 B1 | 10/1997 |
| EP | 0664932 B1 | 1/1998 |
| EP | 0832502 A1 | 4/1998 |
| EP | 0823135 B1 | 11/1998 |
| EP | 0895528 A1 | 2/1999 |
| EP | 0987349 A1 | 3/2000 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1723687 A1 | 11/2006 |
| EP | 1723687 B1 | 5/2010 |
| EP | 2274781 A1 | 1/2011 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| EP | 2973842 A | 5/2019 |
| GB | 1238356 A | 7/1971 |
| GB | 1286173 A | 8/1972 |
| IN | 201917002254 A | 4/2019 |
| JP | S4827097 A | 4/1973 |
| JP | S4827097 B1 | 8/1973 |
| JP | S56500790 A | 6/1981 |
| JP | S56162870 A | 12/1981 |
| JP | S56162870 U | 12/1981 |
| JP | 1-163977 A | 6/1989 |
| JP | H01159973 A | 6/1989 |
| JP | H0790662 A | 4/1995 |
| JP | 09501256 A | 2/1997 |
| JP | 10-509554 A | 9/1998 |
| JP | 2000205200 A | 7/2000 |
| JP | 2002194411 A | 7/2002 |
| JP | 3387724 B2 | 3/2003 |
| JP | 2008251491 A | 10/2008 |
| JP | 2008277315 A | 11/2008 |
| JP | 2009529213 A | 8/2009 |
| JP | 2009543674 A | 12/2009 |
| JP | 2010140736 A | 6/2010 |
| JP | 2010192313 A | 9/2010 |
| JP | 2010262876 A | 11/2010 |
| JP | 2011003313 A | 1/2011 |
| JP | 2011173083 A | 9/2011 |
| JP | 2011228079 A | 11/2011 |
| JP | 2012518095 A | 8/2012 |
| JP | 2013503257 A | 1/2013 |
| JP | 2013505544 A | 2/2013 |
| JP | 2013507741 A | 3/2013 |
| JP | 2013134838 A | 7/2013 |
| JP | 2014127289 A | 7/2014 |
| JP | 2014150056 A | 8/2014 |
| JP | 2015076379 A | 4/2015 |
| JP | 2016091605 A | 5/2016 |
| JP | 5952540 B2 | 7/2016 |
| JP | 2016136521 A | 7/2016 |
| JP | 6032018 B2 | 11/2016 |
| JP | 2017076595 A | 4/2017 |
| JP | 2017139231 A | 8/2017 |
| JP | 6234917 B2 | 11/2017 |
| JP | 2017216126 A | 12/2017 |
| JP | 2018006057 A | 1/2018 |
| JP | 2018006121 A | 1/2018 |
| JP | 2018046020 A | 3/2018 |
| JP | 2018067399 A | 4/2018 |
| JP | 6352884 B2 | 7/2018 |
| JP | 6363244 B2 | 7/2018 |
| JP | 2018529207 A | 10/2018 |
| JP | 6682102 B2 | 4/2020 |
| KR | 20120122053 A | 11/2012 |
| KR | 20140068850 A | 6/2014 |
| KR | 20160115912 A | 10/2016 |
| KR | 20180063144 A | 6/2018 |
| KR | 20190066865 A | 6/2019 |
| WO | 8402429 A1 | 6/1984 |
| WO | 8905528 A1 | 6/1989 |
| WO | 9321664 A1 | 10/1993 |
| WO | 02/01666 A | 1/2002 |
| WO | 2008058165 A2 | 5/2008 |
| WO | 2009087917 A1 | 7/2009 |
| WO | 2010065890 A1 | 6/2010 |
| WO | 2011035176 A1 | 3/2011 |
| WO | 2011044528 A1 | 4/2011 |
| WO | 2011103142 A1 | 8/2011 |
| WO | 2021226399 A1 | 11/2011 |
| WO | 2011163553 A1 | 12/2011 |
| WO | 2012012364 A1 | 1/2012 |
| WO | 2012012558 A2 | 1/2012 |
| WO | 2012138576 A1 | 10/2012 |
| WO | 2012156972 A1 | 11/2012 |
| WO | 2013005050 A1 | 1/2013 |
| WO | 2012174433 A3 | 3/2013 |
| WO | 2013053653 A2 | 4/2013 |
| WO | 2013090680 A2 | 6/2013 |
| WO | 2014124386 A1 | 8/2014 |
| WO | 2014142666 A1 | 9/2014 |
| WO | 2015042573 A1 | 3/2015 |
| WO | 2015119041 A1 | 8/2015 |
| WO | 2015145690 A1 | 10/2015 |
| WO | 2015150784 A1 | 10/2015 |
| WO | 2016088673 A1 | 6/2016 |
| WO | 2016138594 A1 | 9/2016 |
| WO | 2016197109 A1 | 12/2016 |
| WO | 2017006666 A1 | 1/2017 |
| WO | 2017045072 A1 | 3/2017 |
| WO | 2017049414 A1 | 3/2017 |
| WO | 2017075577 A1 | 5/2017 |
| WO | 2017117373 A1 | 7/2017 |
| WO | 2017223219 A1 | 12/2017 |
| WO | 2018009930 A2 | 1/2018 |
| WO | 2018018036 A1 | 1/2018 |
| WO | 2018052376 A1 | 3/2018 |
| WO | 2018187561 A1 | 10/2018 |
| WO | 2020006419 A1 | 1/2020 |
| WO | 2020006436 A1 | 1/2020 |
| WO | 2020006506 A2 | 1/2020 |
| WO | 2020023912 A1 | 1/2020 |
| WO | 2020067226 A1 | 4/2020 |
| WO | 2020264344 A1 | 12/2020 |
| WO | 2020264386 A1 | 12/2020 |
| WO | 2020264415 A1 | 12/2020 |
| WO | 2021021681 A1 | 2/2021 |
| WO | 2021021685 A1 | 2/2021 |

OTHER PUBLICATIONS

International Search Report & Written Opinion of the International Searching Authority issued in International Application No. PCT/US2017/043500 dated Nov. 29, 2017.
International Preliminary Report on Patentability issued in International Application No. PCT/US2017/043500 dated Jul. 23, 2018.
Office Action dated May 27, 2020, issued in corresponding India Patent Application No. 201817034674 (7 pgs.).
Non-final Office Action dated Oct. 8, 2019, issued in corresponding Japanese Patent Application No. 2018-550404 with English translation.
Mitra D., et al., "An Efficient and Robust Surface-Modified Iron Electrode for Oxygen Evolution in Alkaline Water Electrolysis," Journal of the Electrochemical Society, 2018, vol. 165, No. 5, pp. F392-F400.
Narayan S. R., et al., "Bi-Functional Oxygen Electrodes-Challenges and Prospects," The Electrochemical Society Interface, Summer 2015, pp. 65-69.

(56) References Cited

OTHER PUBLICATIONS

Neburchilov V., et al., "Metal-Air And Metal-Sulfur Batteries: Fundamentals and Applications," CRC Press Taylor Francis Group, 6000 Broken Sound Parkway NW, Suite 300, Boca Raton, FL 33487-2742, Taylor 1 Francis Group, LLC, CRC Press is an imprint of Taylor & Francis Group, an Informa business, 2017, 210 Pages.
"Nickel," Efunda: The Ultimate Online Reference for Engineers, eFunda, Inc., Web, Sep. 5, 2014.
Non-final Office Action U.S. Appl. No. 14/505,234 dated Aug. 25, 2017, 15 Pages.
Notice of Allowance for U.S. Appl. No. 14/505,234 dated Jun. 29, 2018, 10 Pages.
Notice of Allowance Japanese Patent Application No. 2015-557176 dated Mar. 13, 2018 with English translation, 5 pages.
Notification Concerning Transmittal of a Copy of International Preliminary Report on Patentability and Written Opinion of the International Search Authority for International Patent Application No. PCT/US2018/026243, mailed Oct. 17, 2019 9 pages.
Notification of Transmittal of the International Search Report and Written Opinion of the International Search Authority or International Patent Application No. PCT/US2020/039889, mailed Oct. 15, 2020, 11 pages.
Notification of Transmittal of the International Search Report and Written Opinion of the International Search Authority or International Patent Application No. PCT/US2020/039942, mailed Oct. 22, 2020, 17 pages.
Notification of Transmittal of the International Search Report and Written Opinion of the International Search Authority por International Patent Application No. PCT/US2020/039976, mailed Oct. 23, 2020, 11 pages.
Office Action dated Jan. 13, 2012 issued in corresponding Chinese Patent Application No. 201120307185.2 w/English translation, 9 Pages.
Office Action dated Jun. 17, 2021, issued in corresponding Brazilian Application No. BR112019000713-0 with informal translation, 5 Pages.
Office Action dated Jun. 3, 2021, issued in corresponding Chinese Patent Application No. 201780045371.3 with English translation, 8 Pages.
Office Action dated Mar. 28, 2017 in Chinese Application 201480017311.7, 21 pages.
Office Action for Australian Patent Application No. 2012332825 dated Nov. 25, 2015, 3 pages.
Office Action for Canadian Patent Application 2853245 dated Jun. 15, 2017, 3 pages.
Office Action for Canadian Patent Application 2853245 dated Sep. 23, 2016, 3 pages.
Office Action for Chinese Application No. 201780034966.9, mailed Jan. 13, 2023, 19 pages.
Office Action issued in corresponding Japanese Patent Application No. 2017-093977 dated May 8, 2018 with English translation, 4 pages.
Office Action issued in corresponding Mexico Application No. MX/a/2014/005136 dated Apr. 17, 2018.
Pan J., et al., "Constructing Ionic Highway in Alkaline Polymer Electrolytes," Energy and Environmental Science, 2014, vol. 7, pp. 354-360.
Park C.H., et al., "Electrochemical Stability and Conductivity Enhancement of Composite Polymer Electrolytes," Solid State Ionics, 2003, vol. 159, pp. 111-119.
Perkins N.R., et al., "Hydrogen Oxidation Electrodes and Electrochemical Cells Including the Same," U.S. Appl. No. 16/951,396, filed Nov. 18, 2020, 88 Pages.
"PTFE," Polymers: A Properties Database (Online), Taylor and Francis Group, LLC, Web, Sep. 5, 2014.
Rejection Decision, Japanese Patent Application No. 2015-557176 dated Oct. 17, 2017 with English translation, 12 pages.
Roe S., et al., "A High Energy Density Vanadium Redox Flow Battery with 3 M Vanadium Electrolyte," Journal of The Electrochemical Society, 2016, vol. 163, No. 1, pp. A5023-A5028.
Ross P.N., et al., "Feasibility Study of a New Zinc-Air Battery Concept Using Flowing Alkaline Electrolyte," Intersociety Energy Conversion Engineering Conference, Aug. 25, 1986, vol. 2, pp. 1066-1072.
Salloum et al., "Sequential Flow Membraneless Microfluidic Fuel Cell with Porous Electrodes," Journal of Power Sources, 2008, vol. 180, pp. 243-252.
Sandal H. et al., "Iron-Based Heterogeneous Catalysts for Oxygen Evolution Reaction, change in Perspective from Activity Promoter to Active Catalyst," Journal of Power Sources, 2018, vol. 395, 22 pages.
Sayilgan E., et al., "A Review of Technologies for the Recovery of Metals from Spent Alkaline and Zinc-Carbon Batteries," Hydrometallurgy, 2009, vol. 97, No. 3-4, pp. 158-166, XP026116549.
Second Office Action Chinese Patent Application No. 201480017311.7 dated Feb. 2, 2018 with English translation.
Sen R.K., et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 1988, 96 Pages.
Sevinc S., et al., "In-Situ Tracking of NaFePO4 Formation In Aqueous Electrolytes and its Electrochemical Performances In Na-Ion/Polysulfide Batteries," Journal of Power Sources, 2019, vol. 412, pp. 55-62.
Smedley, et al., "A Regenerative Zinc-air Fuel Cell," Journal of Power Sources, 2007, vol. 165, pp. 897-904.
Smith R.D.L., et al., "Water Oxidation Catalysis: Electrocatalytic Response to Metal Stoichiometry in Amorphous Metal Oxide Films Containing Iron, Cobalt, and Nickel," Journal of the American Chemical Society, 2013, vol. 135, No. 31, pp. 11580-11586.
Song T., et al., "Solubility and Diffusivity of Oxygen in Ionic Liquids," Oct. 10, 2019, Journal of Chemical and Engineering Data, vol. 64, pp. 4956-4967.
Tekin B., et al., "A New Sodium-Based Aqueous Rechargeable Battery System: The Special Case of Na0.44MnO2/Dissolved Sodium Polysulfide," Energy Technology, 2017, vol. 5, pp. 2182-2188, DOI: 10.1002/ente.201700245.
Thirsk H.R., "Electrochemistry," Thirsk, Ed., The Chemical Society Great Britain Oxford Alden Press, 1974, vol. 4, pp. 16.
Tian B., et al., "The Effect of Na2S Additive in Alkaline Electrolyte on Improved Performances of Fe-Based Air Batteries," Electrochimica Acta, 2018, vol. 259, pp. 196-203.
Timofeeva E.V., "Rechargeable Nanofluid Electrodes for High Energy Density Flow Battery," NSTI-Nanotech, Jan. 1, 2013, vol. 2, pp. 679-682, XP055863711.
Trocino S., et al., "High Performance Solid-State Iron-Air Rechargeable Ceramic Battery Operating at Intermediate Temperatures (500-650 C)," Applied Energy, 2019, 9 Pages.
Wei X., et al., "An Aqueous Redox Flow Battery Based on Neutral Alkali Metal Ferri/Ferrocyanide and Polysulfide Electrolytes," Journal of The Electrochemical Society, Nov. 13, 2015, vol. 163, No. 1, pp. A5150-A5153, XP055667015.
Weinrich H., et al., "Understanding the Nanoscale Redox-Behavior of Iron-Anodes for Rechargeable Iron-Air Batteries," Nano Energy, Institute of Energy and Climate Research-Fundamental Electrochemistry (IEK-9) Center for Nanophase Materials Sciences, Oak Ridge National Laboratory. Oak Ridge, Tennessee 378, US, 2017, 46 pages, View Online https://doi.Org/10.1016/j.nanoen.2017.10.023.
Wijayamohanan K., et al., "Rechargeable Alkaline Iron Electrodes," Journal of Power Sources, 1991, vol. 34, pp. 269-285.
Wilke S.K., et al., "Structural Evolution of Directionally Freeze-Cast Iron Foams During Oxidation/Reduction Cycles," Acta Materialia, 2019, vol. 162, pp. 90-102.
Written Opinion for International Application No. PCT/US2016/036026, mailed Sep. 29, 2016, 14 Pages.
Written Opinion of the International Preliminary Examining Authority dated Feb. 24, 2017 for Application. No. PCT/US2016/023564.

(56) References Cited

OTHER PUBLICATIONS

Written Opinion of the International Preliminary Examining Authority PCT/US2016/036026 dated May 9, 2017, 13 Pages.
Written Opinion of the International Searching Authority PCT/US2019/031118 dated Aug. 29, 2019, 13 Pages.
Yang B., et al., "Organo-Sulfur Molecules Enable Iron-Based Battery Electrodes to Meet the Challenges of Large-Scale Electrical Energy Storage," Energy Environment Science, 2014, vol. 7, pp. 2753-2763.
Yang C., et al., "Unique Aqueous Li-ion/sulfur Chemistry With High Energy Density and Reversibility," Proceedings of the National Academy of Sciences of the United States of America, Jun. 13, 2017, vol. 114, No. 24, pp. 6197-6202, Retrieved from URL:www.pnas.org/cgi/doi/10.1073/pnas.1703937114.
You S., et al., "A Microbial Fuel Cell Using Permanganate as the Cathodic Electron Acceptor," Journal of Power Sources, 2006, vol. 162, pp. 1409-1415.
Yu W., et al., "Toward a New Generation of Low Cost, Efficient, and Durable Metal-Air Flow Batteries," Journal of Materials Chemistry A, Royal Society of Chemistry, GB, Dec. 3, 2019, vol. 7, No. 47, pp. 26744-26768, DOI: 10.1039/C9TA10658H, ISSN 2050-7488, XP055863708.
Yu X., et al., "A Voltage-Enhanced, Low-Cost Aqueous Iron-Air Battery Enabled with a Mediator-Ion Solid Electrolyte," ACS Energy Letters, 2017, vol. 2, pp. 1050-1055, DOI: 10.1021/acsenergylett.7b00168.
Yun S., et al., "Materials and Device Constructions for Aqueous Lithium-Sulfur Batteries," Advanced Functional Materials, 2018, vol. 28, pp. 1-17, (1707593), DOI: 10.1002/adfm.201707593.
Zheng J., et al., "Rotating Ring-Disk Electrode Method," Rotating Electrode Methods and Oxygen Reduction Electrocatalysts, NL, Elsevier, Apr. 25, 2014, pp. 199-229, DOI: 10.1016/B978-0-444-63278-4.00006-9, ISBN 9780444632784, XP009522170.
International Preliminary Report on Patentability for International Application No. PCT/US2016/023564, dated May 30, 2017, 16 Pages.
International Preliminary Report on Patentability for International Application No. PCT/US2016/036026 mailed Oct. 13, 2017, 26 Pages.
International Preliminary Report on Patentability for International Application No. PCT/US2017/043489, dated Aug. 6, 2018, 20 Pages.
International Preliminary Report on Patentability for International Application No. PCT/US2019/039844, mailed Jan. 7, 2021, 11 Pages.
International Preliminary Report on Patentability for International Application No. PCT/US2019/039973, mailed Jan. 7, 2021, 20 Pages.
International Preliminary Report on Patentability for International Application No. PCT/US2020/031760, dated Nov. 25, 2021, 07 Pages.
International Preliminary Report on Patentability for International Application No. PCT/US2020/039889, mailed Jan. 6, 2022, 8 Pages.
International Preliminary Report on Patentability for International Application No. PCT/US2020/061081, mailed Jun. 2, 2022, 07 Pages.
International Preliminary Report on Patentability for International Application No. PCT/US2021/031184, mailed Nov. 17, 2022, 6 Pages.
International Search Report and Written Opinion for International Application No. PCT/US2011/049558 mailed Nov. 16, 2011, 11 pages.
International Search Report and Written Opinion for International Application No. PCT/US2012/047395 mailed Sep. 28, 2012, 10 pages.
International Search Report and Written Opinion for International Application No. PCT/US2012/062503, mailed Jan. 24, 2013, 09 Pages.
International Search Report and Written Opinion for International Application No. PCT/US2014/015613, mailed Jul. 11, 2014, 23 Pages.
International Search Report and Written Opinion for International Application No. PCT/US2016/023564, mailed Jun. 16, 2016, 12 Pages.
International Search Report and Written Opinion for International Application No. PCT/US2017/043489, mailed Nov. 29, 2017, 12 Pages.
International Search Report and Written Opinion for International Application No. PCT/US2020/061081, mailed Apr. 19, 2021, 10 Pages.
International Search Report and Written Opinion for International Application No. PCT/US2021/031184, mailed Aug. 27, 2021, 07 Pages.
International Search Report and Written Opinion of International Application No. PCT/US2020/043630, mailed Nov. 11, 2020, 9 Pages.
International Search Report and Written Opinion of the International Application No. PCT/US2020/043639, mailed Nov. 13, 2020, 11 Pages.
International Search Report and Written Opinion of the International Searching Authority dated Aug. 25, 2020, issued in corresponding International Application No. PCT/US2020/031760, 13 Pages.
International Search Report and Written Opinion of the International Searching Authority for International Patent Application No. PCT/US2018/026243, mailed Jul. 27, 2018, 12 Pages.
International Search Report and Written Opinion of the International Searching Authority for International Patent Application No. PCT/US2019/039844, mailed Oct. 23, 2019, 15 Pages.
International Search Report and Written Opinion of the International Searching Authority for International Patent Application No. PCT/US2019/039867, mailed Nov. 15, 2019, 19 Pages.
International Search Report and Written Opinion of the International Searching Authority for International Patent Application No. PCT/US2019/039973, mailed Jan. 13, 2020, 26 Pages.
International Search Report and Written Opinion of the International Searching Authority for International Patent Application No. PCT/US2019/043745, mailed Nov. 13, 2019, 17 Pages.
International Search Report for International Application No. PCT/US2009/039460, mailed May 26, 2009, 3 pages.
International Search Report for International Application No. PCT/US2009/040658, mailed Aug. 24, 2009, 3 pages.
International Search Report for International Application No. PCT/US2016/036026, mailed Sep. 29, 2016, 05 Pages.
International Search Report for International Application No. PCT/US2019/031118 dated Aug. 29, 2019, 3 pages.
Japanese Office Action dated Feb. 9, 2016 for Application No. 2014-540009, 14 pages.
Japanese Office Action dated Jan. 10, 2017 for Application No. 2014-540009, 17 pages.
Jayashree, et al., "Air-Breathing Laminar Flow-Based Microfluidic Fuel Cell," Journal of American Chemical Society, 2005, vol. 127, pp. 16758-16759.
Ji X., et al., "Stabilizing Lithium-Sulphur Cathodes Using Polysulphide Reservoirs," Nature Communications, 2011, vol. 2, No. 325, 8 Pages, View Online, DOI: 10.1038/icomms1293.
Jin X., et al., "A High-Fidelity Multiphysics Model for the New Solid Oxide Iron-Air Redox Battery Part I: Bridging Mass Transport and Charge Transfer with Redox Cycle Kinetics," Journal of Power Sources, 2015, vol. 280, pp. 195-204.
Jorne J., et al., "Suppression of Dendrites and Roughness during Electrodeposition by Impinging Flow," Journal of the Electrochemical Society, Jun. 1987, vol. 134, No. 6, pp. 1399-1402.
Kadyk T., et al., "How to Enhance Gas Removal from Porous Electrodes?," Scientific Reports, 2016, vol. 6, No. 38780, pp. 1-14, View Online, DOI: 10.1038/SREP38780.
Klaus S., et al., "Effects of Fe Electrolyte Impurities on Ni(OH)2/NiOOH Structure and Oxygen Evolution Activity," View Online, Journal of Physical Chemistry C, 2015, vol. 119, No. 13, pp. 7243-7254, DOI:10.1021/acs.jpcc.5b00105.

(56) References Cited

OTHER PUBLICATIONS

Li Q., et al., "All Solid Lithium Polymer Batteries With a Novel Composite Polymer Electrolyte," Solid State Ionics, 2003, vol. 159, pp. 97-109.
Li Z., et al., "A High-Energy and Low-Cost Polysulfide/iodide Redox Flow Battery," Nano Energy, 2016, vol. 30, pp. 283-292.
Li Z., et al., "Air-Breathing Aqueous Sulfur Flow Battery for Ultralow-Cost Long-Duration Electrical Storage," Joule 1, Cell Press, Oct. 11, 2017, vol. 1, No. 2, pp. 306-327, doi:10.1016/j.joule. 2017.08.007, ISSN 2542-4351, XP055667017.
Li Z., et al., "Air-Breathing Aqueous Sulfur Flow Battery for Ultralow-Cost Long-Duration Electrical Storage," Joule, Oct. 11, 2017, vol. 1, No. 2, pp. 306-327, XP055667017.
Licht S., "A Novel Aqueous Aluminum Permanganate Fuel Cell," Electrochemistry Communications, 1999, vol. 1, pp. 33-36.
"Low," Lexico.com, US Dictionary, Oxford University Press, Retrieved on Oct. 13, 2021, 5 Pages, Retrieved from URL: https://www.lexico.com/en/definition/low.
Mainar A.R., et al., "Alkaline Aqueous Electrolytes for Secondary Zinc-Air Batteries: An Overview," International Journal of Energy Research, 2016, vol. 40, pp. 1032-1049.
Malkhandi S., et al., "Organo-Sulfur Additives for Suppressing Hydrogen Evolution in Iron-air Battery," Abstract #688, 220th ECS Meeting, The Electrochemical Society, 2011, 1 page.
Matsuda A., et al., "Preparation of Hydroxide Ion Conductive KOH-ZrO2 Electrolyte for all-Solid State Iron/Air Secondary Battery," Solid State Ionics, 2014, vol. 262, pp. 188-191.
Maurya S., et al., "A Review on Recent Developments of Anion Exchange Membranes for Fuel Cells and Redox Flow Batteries," View online DOI: 10.1039/c5ra04741b, RSC Advances, 2015, vol. 5, pp. 37206-37230.
McKerracher R.D., et al., "A Review of the Iron-Air Secondary Battery for Energy Storage," View online DOI: 10.1002/cplu. 201402238, ChemPlusChem, 2015, vol. 80, pp. 323-335.
Merle G., et al., "Anion exchange membranes for alkaline fuel cells: A review," Journal of Membrane Science, 2011, vol. 377, 35 pages.
Mitra D., et al., "A Stable and Electrocatalytic Iron Electrode for Oxygen Evolution in Alkaline Water Electrolysis," published Online https://doi.org/10.1007/s11244-018-0971-9, Springer Science+Business Media, LLC, part of Springer Nature 2018, Apr. 23, 2018, 10 pages.
Agarwal R.C., et al., "Study of Electrical and Electrochemical Behaviour on Hot-press Synthesized Nano-Composite Polymer Electrolyte (NCPE) Membranes: [(70PEO: 30 KNO3) + x SiO2]," International Journal of Electrochemical Science, 2011, vol. 6, pp. 867-881.
Ai W., et al., "A Novel Graphene-Polysulfide Anode Material for High-Performance Lithium-Ion Batteries," Scientific Reports, 2013, vol. 3, No. 2341, 5 pages, DOI: 10.1038/srep0234.
Al-Hoshan M.S., et al., "Synthesis, Physicochemical and Electrochemical Properties of Nickel Ferrite Spinels Obtained by Hydrothermal Method for the Oxygen Evolution Reaction (OER)," International Journal of Electrochemical Science, 2012, vol. 7, pp. 4959-4973.
Arunchander A., et al., "Synthesis of Flower-Like Molybdenum Sulfide/Graphene Hybrid as an Efficient Oxygen Reduction Electrocatalyst for Anion Exchange Membrane Fuel Cells," Journal of Power Sources, 2017, vol. 353, pp. 104-114.
Bisoi S., et al., "Gas Separation Properties of Troeger's Base-Bridged Polyamides," e-Polymers, 2017, vol. 17, No. 4, pp. 283-293, DOI: https://doi.org/10.1515/epoly-2016-0291.
Blurton K.F., et al., "Metal/Air Batteries: Their Status and Potential—A Review," Journal of Power Sources, 1979, vol. 4, pp. 263-279.
Burke M.S., et al., "Cobalt-Iron (Oxy)Hydroxide Oxygen Evolution Electrocatalysts: The Role of Structure and Composition on Activity, Stability, and Mechanism," J. Am. Chem. Soc., vol. 137, pp. 3638-3648, DOI: 10.1021/acs.5b00281, (2015).
Burke M.S., et al., "Oxygen Evolution Reaction Electrocatalysis on Transition Metal Oxides and (Oxy)hydroxides: Activity Trends and Design Principles," Department of Chemistry and Biochemistry, University of Oregon, Eugene, Oregon 97403, United States, Chemistry of Materials, 2015, 10 pages.
"Busbar," Lexico.com, US Dictionary, Oxford University Press, Retrieved on Oct. 13, 2021, 1 page, Retrieved from URL: https://www.lexico.com/en/definition/busbar.
Cakan R.D., et al., "An Aqueous Electrolyte Rechargeable Li-ion/Polysulfide Battery," Journal of Materials Chemistry A, GB, 2014, vol. 2, No. 24, 5 Pages, DOI:10.1039/C4TA01308E, ISSN 2050-7488, XP055886889, Retrieve from URL: https://pubs.rsc.org/en/content/articlepdf/2014/ta/c4ta01308e.
Carta M., et al., "The Synthesis of Microporous Polymers Using Tröger's Base Formation," Polymer Chemistry, 2014, vol. 5, No. 18, pp. 5267-5272, DOI:10.1039/C4PY00609G, ISSN 1759-9954, XP055770813.
Chakraborty R., et al., "Negative Electrodes For Electrochemical Cells," U.S. Appl. No. 16/523,722, filed Jul. 26, 2019, 157 Pages.
Chen Y., et al., "Harvesting Polysulfides by Sealing the Sulfur Electrode in a Composite Ion-Selective Net," Journal of Power Sources, 2017, vol. 368, pp. 38-45.
Cherepy N.J., et al., "A Zinc/Air Fuel Cell for Electric Vehicles," IEEE publication, 1999, pp. 11-14.
Chiang Y.M., et al., "High Capacity, Temperature-Stable Lithium Aluminum Manganese Oxide Cathodes for Rechargeable Batteries," Electrochemical and Solid-State Letters, 1999, vol. 2, No. 3, pp. 107-110.
Chinese Office Action dated Dec. 28, 2015 for Appln. No. 2015122301567800.
Chinese Office Action dated Feb. 19, 2013 (with partial English Language translation) of Chinese Patent Appln. No. 201220585211.2 filed Nov. 16, 2012, 4 Pages.
Chinese Office Action dated Feb. 3, 2017 for Application No. 2012800344431, 7 pages.
Chinese Office Action dated Jul. 18, 2016 for Appln. No. 2012102393449.
Chinese Office Action dated May 4, 2016 for Application No. 2012800344431, 17 pages.
Chinese Search Report dated Dec. 6, 2012 of Chinese Appl No. 201220336003.9 filed Jul. 10, 2012 (1 page Chinese Actionwith 3-page Engl. translation).
Cohen J.L., et al., "Fabrication and Preliminary Testing of a Planar Membraneless Microchannel Fuel Cell," Journal of Power Sources, 2005, vol. 139, pp. 96-105.
Colli A.N., et al., "High Energy Density MnO4-/MnO42- Redox Couple for Alkaline Redox Flow Batteries," Chemical Communications, 2016, vol. 52, pp. 14039-14042.
Communication under Rule 71(3) EPC, EP Application No. 14749407.4, dated Sep. 29, 2017, 6 Pages.
Cui B., et al., "Improved Cycle Iron Molten Air Battery Performance Using a Robust Fin Air Electrode," Journal of The Electrochemical Society, 2017, vol. 164, No. 2, pp. A88-A92.
Decision to Grant EP Application No. 14749407.4 dated Mar. 8, 2018, 2 Pages.
Demir-Cakan R., et al., "Use of Ion-selective Polymer Membranes for an Aqueous Electrolyte Rechargeable Li-ion-Polysulphide Battery," Journal of Materials Chemistry A, 2015, vol. 3, pp. 2869-2875, DOI: 10.1039/c4ta05756b.
Dias F.B., et al., "Trends in Polymer Electrolytes for Secondary Lithium Batteries", Journal of Power Sources, 2000, vol. 88, pp. 169-191.
Djefors L., et al., "An-Iron-Air Vehicle Battery," Journal of Power Sources, 1977, vol. 2, pp. 287-296.
Egashira M., et al., "Iron-Air (Secondary and Primary)," Yamaguchi University, Yamaguchi, Japan & 2009 Elsevier B.V. All rights reserved, 2009, pp. 372-375.
Examination Report for Australian Patent Application No. 2014214641 dated Jun. 26, 2017, 6 pages.
Extended European Search Report for European Application No. 12845720.7, mailed Jul. 16, 2015, 7 Pages.
Extended European Search Report for European Application No. 14749407.4, mailed Aug. 31, 2016, 6 Pages.
Extended European Search Report for European Application No. 19826880.7, mailed Feb. 4, 2022, 8 Pages.

(56) References Cited

OTHER PUBLICATIONS

Extended European Search Report for European Application No. 19827057.1, mailed Feb. 11, 2022, 8 Pages.
Extended European Search Report of EP Application No. 09751078.8, dated Jul. 27, 2012, 6 Pages.
Ferrigno R., et al., "Membraneless Vanadium Redox Fuel Cell Using Laminar Flow," Journal of American Chemical Society, 2002, vol. 124, pp. 12930-12931.
Figueredo-Rodriguez H.A., et al., "A Rechargeable, Aqueous Iron Air Battery with Nanostructured Electrodes Capable of High Energy Density Operation," Journal of The Electrochemical Society, 2017, vol. 164, No. 6, pp. A1148-1157.
Gross M.M., et al., "Aqueous Polysulfide-Air Battery with a Mediator-Ion Solid Electrolyte and a Copper Sulfide Catalyst for Polysulfide Redox," ACS Applied Energy Materials, 2018, vol. 1, No. 12, 7 Pages, DOI: 10.1021/acsaem.8b01679.
Hall D.E., "Porous Nickel-Coated Steel Anodes for Alkaline Water Electrolysis: Corrosion Resistance," Journal of the Electrochemical Society, Feb. 1982, vol. 129, No. 2, pp. 310-315.
Hall D.E., "Ni(OH)2-Impregnated Anodes for Alkaline Water Electrolysis," Journal of Electrochemical Society, 1983, vol. 130, No. 2, pp. 517-521.
Hang B.T., et al., "Effect of Additives on the Electrochemical Properties of Fe2O3/C Nanocomposite for Fe/air Battery Anode," Journal of Electroanalytical Chemistry, 2016, vol. 762, pp. 59-65.
Hang B.T., et al., "Effect of Metal-sulfide Additives on Electrochemical Properties of Nano-sized Fe2O3-Loaded carbon or Fe/air Battery Anodes," Journal of Power Sources, 2007, vol. 168, pp. 522-532.
"High," Lexico.com, US Dictionary, Oxford University Press, Retrieved on Oct. 13, 2021, 7 pages, Retrieved from URL: https://www.lexico.com/en/definition/high.
International Preliminary Report on Patentability (Chapter 1 of the Patent Cooperation Treaty) for International Application No. PCT/US2009/040658 dated Dec. 2, 2010, 5 Pages.
International Preliminary Report on Patentability for International Application No. PCT/US12/47395 mailed Sep. 19, 2014, 27 pages.
International Preliminary Report on Patentability for International Application No. PCT/US12/62503 mailed Nov. 27, 2013, 25 pages.
International Preliminary Report on Patentability for International Application No. PCT/US2011/049558 mailed Jan. 11, 2013, 15 pages.
International Preliminary Report on Patentability for International Application No. PCT/US2012/062503, dated Oct. 19, 2013, 25 Pages.
International Preliminary Report on Patentability for International Application No. PCT/US2014/015613, mailed Aug. 20, 2015, 19 Pages.
Office Action for Chinese Application No. 201780034966.9, mailed Mar. 31, 2022, 7 pages.
Office Action for Chinese Application No. 201780034966.9, mailed Jul. 3, 2023, 31 pages.
Chinese Office Action, Board Opinions for Chinese Application No. 201780034966.9, mailed Jan. 13, 2023, 17 pages including English-language translation of Board Opinions.
Chinese Office Action, Board Decisions for Chinese Application No. 201780034966.9, mailed Jul. 3, 2023, 29 pages including pages including English-language translation of Board Decisions.
Cao, Z. et al., "Planar all-solid-state rechargeable Zn—air batteries for compact wearable energy storage", Journal of Materials Chemistry A, 2019, vol. 7, pp. 17581-17593.
International Search Report and Written Opinion in PCT/US2023/072680, mailed Dec. 18, 2023, 10 pages.
International Search Report and Written Opinion in PCT/US2023/072684, mailed Dec. 18, 2023, 10 pages.
International Search Report and Written Opinion in PCT/US2023/076700, mailed Jan. 22, 2024, 13 pages.
Office Action in U.S. Appl. No. 16/913,877, mailed Mar. 12, 2024, 12 pages.

* cited by examiner

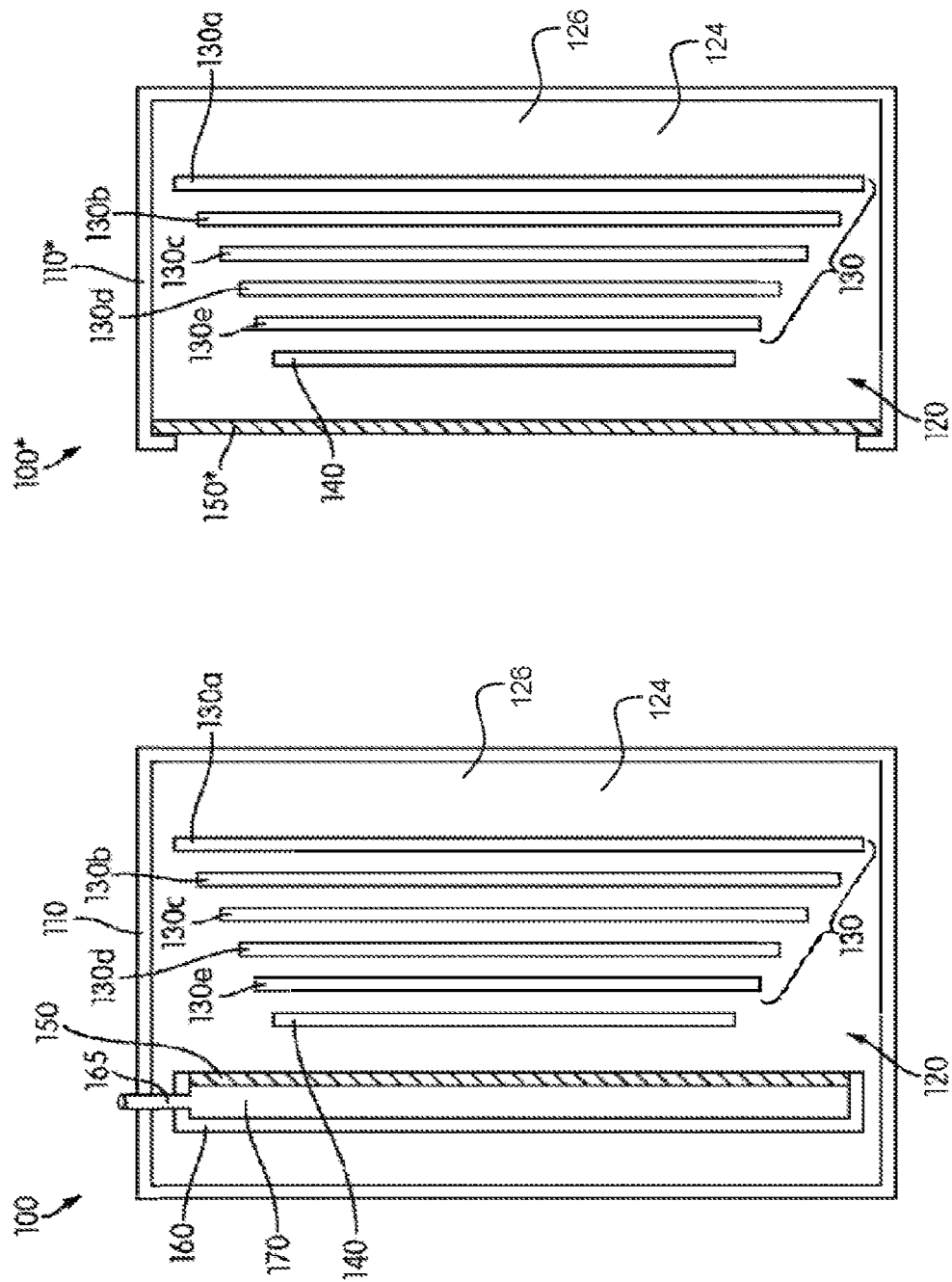

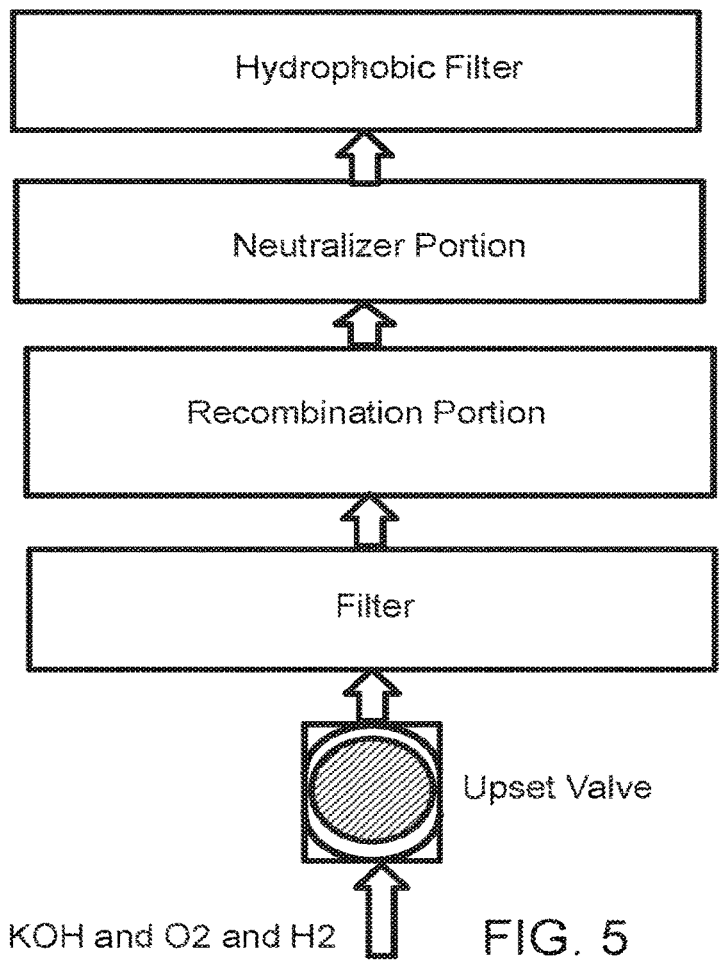
FIG. 5
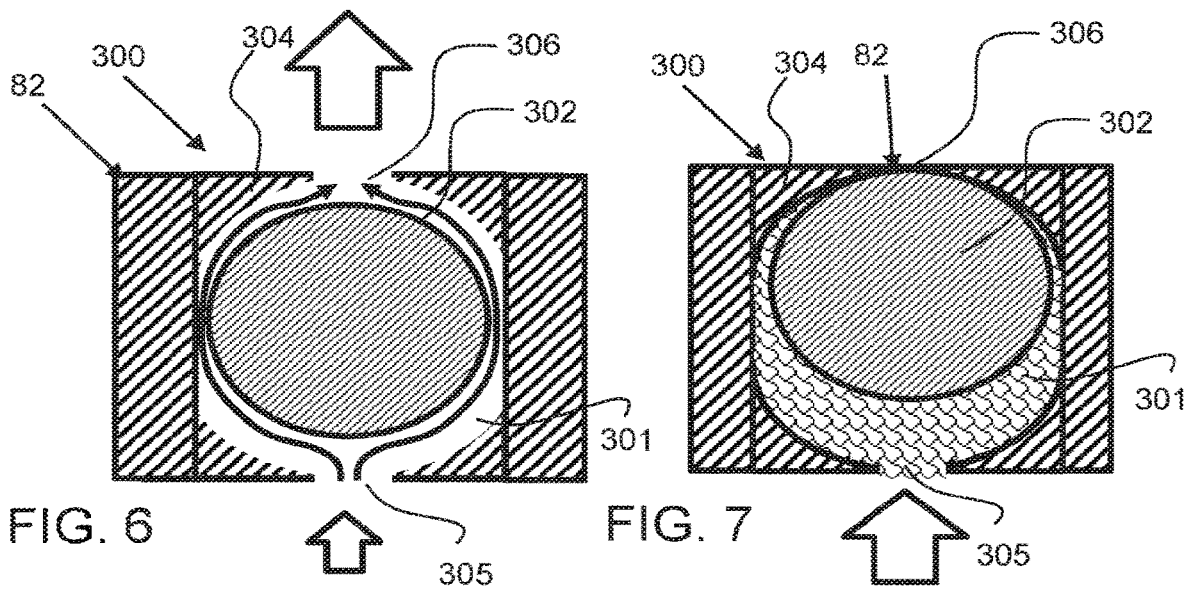
FIG. 6
FIG. 7

MIST ELIMINATION SYSTEM FOR ELECTROCHEMICAL CELLS

CROSS REFERENCE TO RELATED APPLICATIONS

This application is a Continuation Application of U.S. Ser. No. 16/318,560, filed Jan. 17, 2019 and issuing as U.S. Pat. No. 11,228,066 on Jan. 18, 2022, which is the national stage entry of PCT/US2017/043500, filed Jul. 24, 2017, which in turn claims priority to provisional patent application 62/365,924 filed on Jul. 22, 2016. The subject matter of each of these applications is incorporated herein by reference in its entirety.

BACKGROUND

Field

The present disclosure is directed to mist elimination and water management systems for electrochemical cells, and more particularly to electrochemical cells comprising air breathing cathodes and utilizing a liquid ionically conductive medium.

Background

Many types of electrochemical cells utilize a liquid ionically conductive medium to support electrochemical reactions within the cell. Electrochemical cells may utilize an air breathing electrode coupled to a fuel electrode, comprising any suitable fuel. For example, a metal-air electrochemical cell system may comprise a plurality of cells, each having a fuel electrode serving as an anode at which metal fuel is oxidized, and an air breathing oxidant reduction electrode at which oxygen from ambient air is reduced. The liquid ionically conductive medium in such cells may communicate the oxidized/reduced ions between the electrodes.

In various ionically conductive mediums, evaporation, electrolysis (e.g. water splitting on recharge or self-discharge, or other loss of moisture from the ionically conductive medium may be detrimental to the electrochemical cell, particularly for cells requiring water to operate. In some electrochemical cell systems, various gasses may evolve during the charging and/or discharging of the cell. Such gasses may be harmful to the cell, and may damage or impede performance of the cell. For example, an electrochemical cell may be harmed due to the evolved gasses increasing pressure within a confined volume within the cell. In some cases, the cell, and potentially its surroundings, may be harmed due to the evolution of a potentially volatile gas or combination of gasses. As such, some electrochemical cells are configured to disperse such gasses by including vents therein, so that gasses may escape into the ambient environment. For example, U.S. patent application Ser. No. 13/566,948, now issued U.S. Pat. No. 9,214,708 to Fluidic Inc., incorporated herein in its entirety by reference, discloses a membrane gas vent configured to disperse gases out of an electrochemical cell. As another example, U.S. patent application Ser. No. 13/666,864, now issued U.S. Pat. No. 9,269,996 to Fluidic Inc., incorporated herein in its entirety by reference, discloses a hydrophilic gas vent configured to disperse gases out of an electrochemical cell. Other electrochemical cells may be configured with pressure relief valves, which are typically closed under normal pressure condition but open when the pressure within the cell exceeds a threshold amount. A pressure relief valve may simply allow a short term flow of gas from the cell until the pressure is reduced below a threshold limit.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application Ser. No. 12/776,962, now issued U.S. Pat. No. 8,895,197 to Arizona Board of Regents, incorporated herein by reference.

In some electrochemical cell systems comprising liquid electrolytes, various gases evolved may entrain small amounts of liquid electrolyte therein which may be harmful to the cell and surroundings due to the emission of the resulting mist, aerosol or spray. The present application endeavors to provide an effective and improved way of capturing mists or aerosols created by the generation of gas bubbles within a volume of liquid electrolyte in an electrochemical cell and returning the liquid portion of the mist back to the main volume of the liquid electrolyte while dispersing the gas portion of the mist into the ambient environment.

Metal-air electrochemical cells are utilized in a wide variety of environmental conditions, including very hot and dry environments. Metal-air electrochemical cells in arid environments may have limited effectiveness and/or life as a result of the loss of moisture from the liquid ionically conductive medium. It is therefore particularly important to conserve moisture within the cells when operating in arid conditions.

SUMMARY

The disclosure is directed to an electrochemical cell, such as a metal-air electrochemical cell having a mist elimination system. Metal-air electrochemical cells, such as rechargeable metal-air batteries, produce a mist from the ionically conductive media, or electrolyte during normal cycling conditions. Self-discharge of the metal fuel electrode can generate hydrogen bubbles while charging of the metal fuel electrode by reducing metal fuel ions in the electrolyte is balanced by the evolution of oxygen gas on the positive electrode via the oxidation of water or hydroxide ions. The evolved gasses coalesce to form bubbles which will burst at the surface of the electrolyte and create a fine mist of electrolyte entrained in the gas effluent exiting the cell through the cell vent. Without a mist elimination system, the mist will be carried out of the cell through the exhaust vent and thereby decrease the volume of electrolyte.

It is important to conserve the electrolyte within the cell, especially in arid environments. An exemplary mist elimination system in accordance with embodiments of this disclosure comprises a spill prevention device, a filter, a recombination portion, a neutralizer portion and a hydrophobic filter. An exemplary filter captures the mist and may return the mist to the cell. A spill prevention device, such as a tortuous path vent or valve, is used to prevent or substantially prevent liquid electrolyte from freely flowing out of the cell in the event of an upset. An exemplary recombination portion comprises a recombination catalyst that reacts with the hydrogen gas to form water. An exemplary neutralizer portion reacts with an acidic or caustic electrolyte to neutralize it. An exemplary hydrophobic filter is configured on the outside of the mist elimination system and prevents or substantially prevents liquid water from entering the cell.

The electrochemical cell of the present disclosure may, in accordance with embodiments, further comprise a moisture, i.e. water, and carbon dioxide management system, as describe in U.S. provisional patent application No. 62/365,866, the entirety of which is hereby incorporated by reference herein. An exemplary moisture and carbon dioxide management system may be utilized in various electrochemical cells, including metal air cells having a liquid electrolyte, fuel cells, polymer electrolyte membrane (PEM), fuel cells and particularly alkaline fuel cells. An exemplary water and carbon dioxide system comprises a humidity exchange membrane (HEM), for transfer moisture from airflow from the electrochemical cell to air inflow to the cell. An exemplary water and carbon dioxide system may comprise a scrubber that removes carbon dioxide from the air inflow prior to it being deliver to the electrochemical cell. Many electrochemical reactions benefit from an oxygen rich air supply or an air flow with reduced carbon dioxide. An exemplary water and carbon dioxide system may comprise a recirculation valve, wherein at least a portion of the air exiting the electrochemical cell is recirculated back into the air inflow to the cell. Many electrochemical cells produce heat and an exhaust flow that is high in humidity and therefore conserving this moisture through recirculation can effectively conserve the moisture in the system.

A variety of water management techniques are described herein. U.S. patent application Ser. No. 15/077,341, to Fluidic Inc., filed on Mar. 22, 2016, entitled Water Management System In Electrochemical Cells with Vapor Return Comprising Air Electrodes describes some other water management systems and techniques and is incorporated, in its entirety, by reference herein.

The summary of the disclosure is provided as a general introduction to some of the embodiments of the disclosure, and is not intended to be limiting. Additional example embodiments including variations and alternative configurations of the disclosure are provided herein.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure.

FIG. 1 depicts a schematic view of an electrochemical cell having an immersed oxidant reduction electrode.

FIG. 2 depicts a schematic view of an electrochemical cell having an oxidant reduction electrode which defines a boundary wall for the electrochemical cell.

FIG. 5 shows a block diagram of an exemplary mist elimination system.

FIG. 6 shows a cross-section view of an exemplary safety valve having a ball within a conduit and a sealing seat on a downstream end of the conduit.

FIG. 7 show the exemplary safety valve shown in FIG. 6 with the ball pressed against the sealing seat and preventing liquid within the conduit from passing therethrough.

DETAILED DESCRIPTION OF THE ILLUSTRATED EMBODIMENTS

Figure 3:
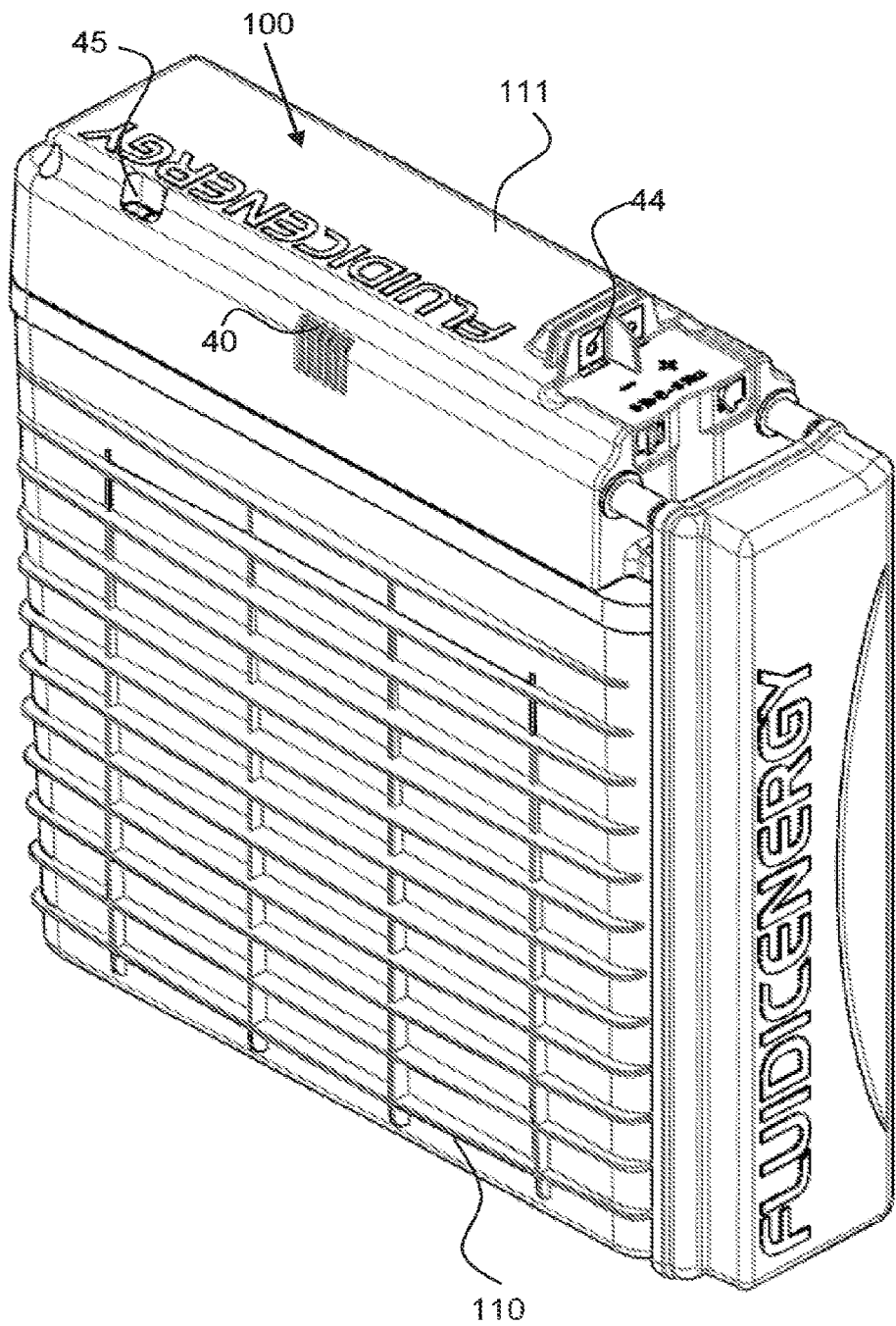
FIG. 3 shows perspective view of an exemplary electrochemical cell.

Corresponding reference characters indicate corresponding parts throughout the several views of the figures. The figures represent an illustration of some of the embodiments of the present disclosure and are not to be construed as limiting the scope of the disclosure in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the disclosure. This description should be read to include one or at least one and the singular also includes the plural unless it is obvious that it is meant otherwise.

Certain exemplary embodiments of the present disclosure are described herein and are illustrated in the accompanying figures. The embodiments described are only for purposes of illustrating the present disclosure and should not be interpreted as limiting the scope of the disclosure. Other embodiments of the disclosure, and certain modifications, combinations and improvements of the described embodiments, will occur to those skilled in the art and all such alternate embodiments, combinations, modifications, improvements are within the scope of the present disclosure.

An exemplary mist elimination system in accordance with embodiments of this disclosure is configured to control the loss of liquid ionically conductive medium, such as an electrolyte, from the electrochemical cell, which may be in the form of a mist or cell gas or vapor. A mist elimination system may comprise a safety vent, baffle or valve, a filter, a hydrogen recombination catalyst, a neutralizer and a hydrophobic filter or any combination thereof, for example. An exemplary mist elimination system in accordance with embodiments of this disclosure prevents or substantially prevents leaks of a liquid ionically conductive medium, or electrolyte in the event of an upset of the cell, and conserves moisture by draining captured moisture as well as chemically formed water, back into the cell.

In an exemplary embodiment, a mist elimination system comprises a spill prevention device, such as a safety vent, baffle or valve, to prevent or substantially prevent liquid from leaking from the cell in the event of an upset. In an exemplary embodiment, a safety valve includes a spherical stop that is free to move within a conduit having a sealing seat on at least the downstream side of the valve, whereby if the cell is upset, the liquid medium therein will flow into the conduit and force the spherical stop against the spherical seat and thereby plug and stop (or substantially stop) the flow of liquid from the cell. Under normal operation however, air flows around the spherical stop to vent the cell. In another exemplary embodiment, a vent having a tortuous path conduit prevents or substantially prevents liquid electrolyte from directly leaking out of the cell and into the filter. The safety vent may comprise a conduit that spirals or otherwise traverses to prevent (or substantially prevent) and reduce any hydrostatic head on the filter and remainder of the mist elimination system in the event of an upset, wherein the cell falls and liquid electrolyte is in direct contact with the safety vent. In an embodiment, an exemplary mist elimination system, or a spill prevention device of a mist elimination system, may be closed and sealed during shipping, such as by being plugged or otherwise covered and sealed. A pressure relief valve may be configured to release pressure from within the cell during shipping as well as during operation and may be configured to open when the pressure within the cell exceeds a threshold value.

An exemplary mist elimination system in accordance with embodiments of this disclosure comprises a filter, which may be configured downstream of the safety vent and may comprise a non-woven or woven filter media, or membrane. In an exemplary embodiment, the filter is a concave filter as described in U.S. Pat. No. 9,269,998, to Fluidic Inc., issued on Feb. 23, 2016 and entitled Concave Gas Vent For Electrochemical Cell; the entirety of which is incorporated by reference herein. An exemplary filter comprises a filter body portion comprised of at least one layer so as to absorb a portion of the ionically conductive liquid or mist. The body portion is formed in a concave shape with an apex positioned towards the top of the cell in its upright orientation, and with body surfaces extending downwardly from said apex so as to drain absorbed ionically conductive medium back into the interior chamber. The body portion contains pores so as to permit permeation of the gas therethrough. The filter may be highly efficient at removing mist and vapor that passes through the safety vent, such as more than about 80% efficient, more than about 90% efficient, more than about 95% efficient, more than about 99% efficient and any range between and including the efficiency values provided.

In an embodiment, the filter layer may be at least partially hydrophobic which may facilitate coalescence and liquid droplet drainage as discussed previously. As a non-limiting example, the filter layer may comprise a polypropylene felt. Such a material may be a non-uniform mat of random fibers formed by needle punching, in accordance with terms known in the textile arts. In various embodiments, the filter material may be in felt shape (i.e. flexible) or may be sintered to form a rigid porous layer, or be an arrangement of these materials. The filter layer 85 may comprise any suitable material. Non-limiting examples of such material include, but are not limited to: polypropylene, polyethylene, polyesters, fluoropolymers, acrylonitrile butadiene styrene (ABS), and Noryl (i.e. modified polyphenylene ether), combinations and derivatives thereof. In some embodiments, at least a portion of the material may be modified by surface treatments (e.g. modifying the hydrophobicity/hydrophilicity). In some embodiments the filter may comprise porous metal foams, including but not limited to comprising metals such as steel, stainless steel, bronze, and copper, and may in some embodiments be coated with a metal layer such as nickel and its alloys.

An exemplary mist elimination system in accordance with embodiments of this disclosure comprises a hydrogen recombination portion comprising a recombination catalyst that reacts with hydrogen/oxygen that may be formed from self-discharging or overcharging of the cell. The hydrogen recombination catalyst may be any suitable catalyst that will react with hydrogen to form water in the presence of oxygen, or other support media. Exemplary recombination catalyst includes, but is not limited to, perovskites, spinels, precious metal based-platinum, palladium etc., $MnO_2$, nickel or a combination of these. An exemplary recombination portion may be configured downstream of the spill prevention device and the filter to protect the recombination catalyst from direct exposure to the electrolyte liquid.

An exemplary mist elimination system in accordance with embodiments of this disclosure comprises a neutralizer that reacts with any liquid ionically conductive medium in the gas that passes through the mist elimination system. Neutralize, as used herein, means to react the liquid ionically conductive medium, in mist or gas phase, with a neutralization media, produce products of the reaction that are near neutral pH, such as to between 4 and 10, and more preferably between 5 and 9, and even more preferably between 6 and 8, in some embodiments. For example, neutralization media comprising an acid may be used to react with any caustic electrolyte, such as potassium hydroxide, KOH. A neutralizer may comprise a solid acid, or an acid supported on carbon or other support media. An acid may be coated onto a carbon or other support material, for example. A neutralizer may be configured with granulated or powder neutralizer media and may be in the form of a packed bed. The neutralizer may be configured in a neutralizer module that is replaceable, as the neutralizer media will be consumed in the reaction with the ionically conductive media, and therefore require replenishment. An exemplary neutralizer portion may be configured downstream of the spill prevention device, the filter and the recombination portion. An exemplary neutralizer may comprise one or more of the following acids: citric, oaxalic, carboxylic, sulfamic, benzoic, boric, sulfuric, hydrochloric, and nitric acid.

An exemplary mist elimination system in accordance with embodiments of this disclosure comprises a hydrophobic filter that may be configured at the exit of the mist elimination system, to both keep any liquid from escaping the cell through the hydrophobic filter and to prevent or substantially prevent water from getting into the cell from the environment. A hydrophobic filter may comprise a fluoropolymer, such as a microporous fluoropolymer membrane, an expanded fluoropolymer membrane such as expanded polytetrafluoroethylene (PTFE) membrane, a polymer membrane, foam, woven media or non-woven media and the like. A microporous media or membrane may have a mean flow pore size, as measured by a Coulter porometer and/or according to ASTM F 316, Standard Test Methods for Pore Size Characteristics of Membrane Filters by Bubble Point and Mean Flow Pore Test, that is less than about 5um, less than about 2 um, or less than 1 um. These membranes may be inherently hydrophobic or may comprise a hydrophobic coating that reduces the surface energy of the media to prevent or substantially prevent liquid water wet-out.

A mist elimination system in accordance with embodiments of this disclosure may comprise multiple layers of one or more elements including the vent baffle or valve, a filter, a hydrogen recombination catalyst, a neutralizer and a hydrophobic filter, to ensure mist elimination and in some cases to provide a factor of safety. For example, two or more layers of hydrophobic filter media may be incorporated into the mist elimination module. In another embodiment, that entire composite stack, or portion thereof is replicated in a separate layer.

Various portions of the electrochemical cell 100 may be of any suitable structure or composition, including but not limited to being formed from plastic, metal, resin, or combinations thereof. Accordingly, the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,269,996, 9,269,998 and U.S. Patent Application Publication Nos. 20100316935, 20110070506, 20110250512, 20120015264, 20120068667, 20120202127, 20120321969, 20130095393, 20130115523, and 20130115525, each of which are incorporated herein in their entireties by reference.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium 124, such as an electrolyte 126, that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. patent application Ser. No. 13/532,374 incorporated above in its entirety by reference. These bubbles may create a mist of the liquid ionically conductive medium that is carried to an exemplary mist elimination system, as described herein.

Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent or substantially prevent seepage of ionically conductive medium therebetween. Such a configuration is generally not preferred, however, due to concerns that a failure of the oxidant reduction electrode 150* would result in leakage of the ionically conductive medium out of the cell 100*. Regardless, in some such embodiments the convective flow of the ionically conductive medium in the cell chamber 120, described in greater detail below, may be in a direction upwards and away from the oxidant reduction electrode 150*, across the top of the fuel electrode 130.

As shown in FIG. 3, an exemplary electrochemical cell 100 comprises a housing 110 for retaining a liquid electrolyte, an air inlet 40 and an exhaust or vent 45. The electrochemical cell also comprises terminals 44 for coupling to a load and/or power supply. A cover 111 extends over the cell.

Figure 4:
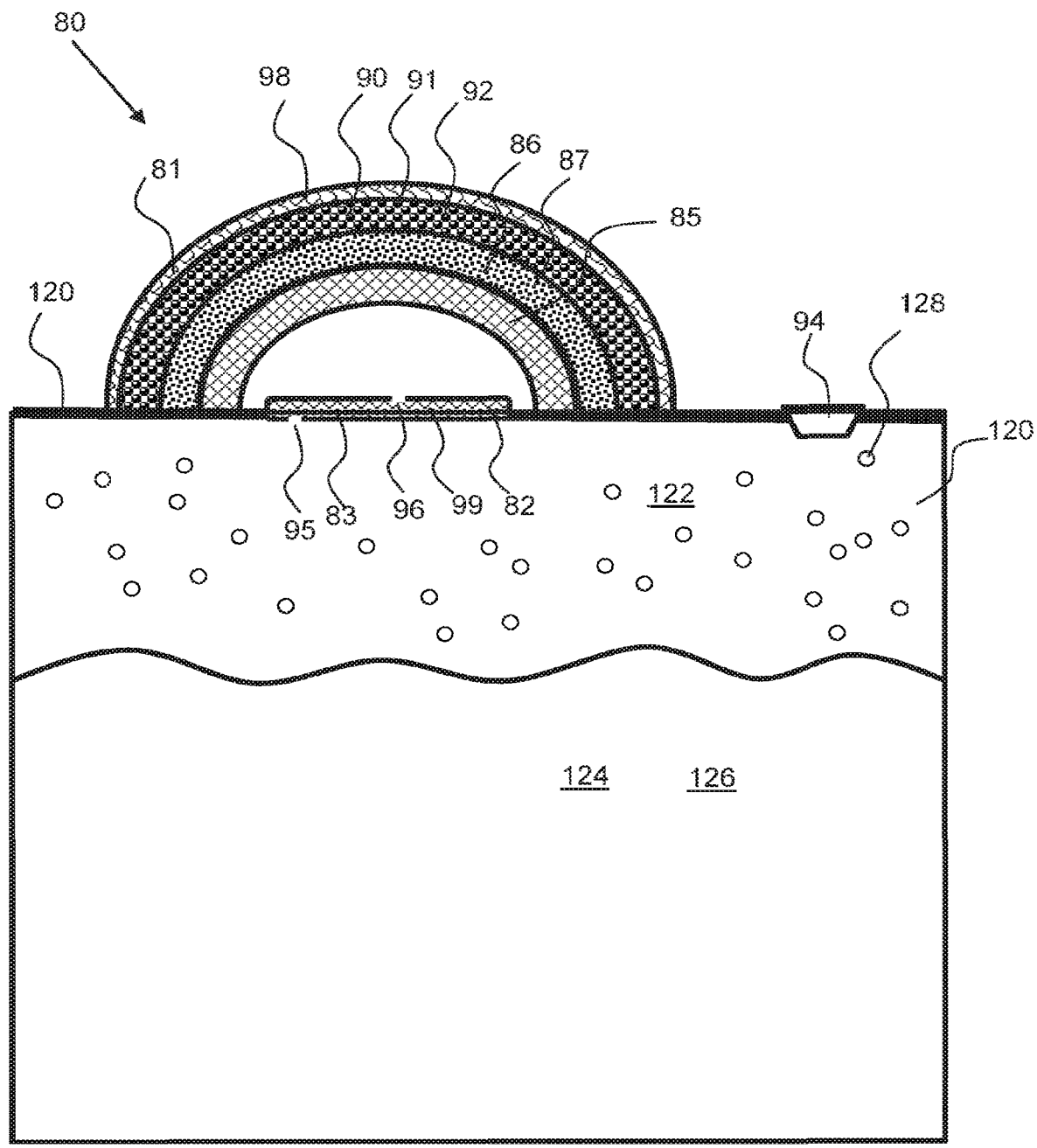
FIG. 4 shows a cross-sectional schematic of an exemplary electrochemical cell having a mist elimination system.

As shown in FIG. 4, a mist elimination system 80 is configured to reduce and/or eliminate mist 128 that evolves from the surface of the ionically conductive medium 124, the electrolyte 126, within the cell chamber 120 due to bubbling of gasses to the surface, and to prevent or substantially prevent leakage of the electrolyte in the event of an upset. The mist elimination system conserves moisture within the interior chamber 122 of the electrochemical cell 100 by preventing or substantially preventing escape of the mist 128 and through reaction of hydrogen to produce water. Also shown in FIG. 4 is a pressure relief valve 94, configured to relieve pressure from within the cell chamber 120 when required, such as when the pressure within the cell chamber exceeds a threshold pressure.

The mist eliminator system comprises a spill prevention device 82, a safety vent 83, that is in communication with the interior chamber 122 of the cell housing 110, and therefore exposed to the ionically conductive medium 124 and/or gas space there above. The exemplary safety vent comprises a tortuous path conduit 99 that will slow the transfer of any liquid electrolyte to the downstream portions of the mist eliminator system. A tortuous path conduit may be a relatively small conduit that spirals or traverses back and forth to create an extended conduit length between the interior opening 95 and the exterior opening 96.

A filter 85 is configured downstream of the safety vent and may be a concave shaped filter that will drain absorbed ionically conductive medium back into the anode chamber, as described in U.S. Pat. No. 9,269,998, Concave Gas Vent For Electrochemical Cell, to Fluidic Inc., the entirety of which is incorporated by reference herein.

The exemplary mist elimination system comprises a hydrogen recombination portion 86, with a hydrogen recombination catalyst 87 that reacts with any hydrogen to form water. The catalyst may be configured on a support material, such as particles or surfaces of the mist elimination system that are exposed to the gas exiting the cell housing from the anode space. Air may enter in to the mist elimination system through the hydrophobic filter to provide the oxygen used for the hydrogen recombination reaction. A parasitic corrosion reaction at the metal anode, or water reduction reaction, may occur in the cell corresponding to the equation $Zn+2H_2O \rightarrow Zn(OH)_2+H_2$, or similar reaction depending on the type of metal used in a metal-air cell. While such hydrogen gas may be in a much smaller quantity than the evolved oxygen, it may be appreciated that the presence of hydrogen within the cell 100 is generally undesirable. In addition, it is desirable to react the hydrogen gas out of the exhaust stream from the electrochemical cell, both to prevent (or substantially prevent) egress of hydrogen from the cell and to regenerate the water lost during the corrosion reaction and return it to the cell.

The exemplary mist elimination system comprises a neutralizer portion 90 comprising a neutralizer media 91, such as an acid component 92, configured to neutralize the ionically conductive medium. For example, the ionically conductive medium may comprise a potassium hydroxide solution that is caustic, and a neutralizer may be a solid acid or acid combined with a support material, such as acid incorporated into and/or carbon. The neutralizer is configured to eliminate any reactive electrolyte that may exhaust from the anode chamber or the chamber containing the ionically conductive medium that is not captured by the mist filter material 85. A neutralizer may comprise an absorbent that will absorb and entrain or absorb and react with the ionically conductive media, such as silica, or a molecular sieve. The neutralizer may also comprise a reactive material such as a solid acid or base or a liquid acid or base entrained in a porous media such as activated carbon. If the ionically conductive media is a base, such as potassium hydroxide, the neutralizer may comprise one or more of the following acids: citric, oaxalic, carboxylic, sulfamic, benzoic, boric, sulfuric, hydrochloric, and nitric acid.

The mist elimination system 80 shown in FIG. 4 also comprises a hydrophobic filter 98 that prevents or substantially prevent moisture from outside of the cell from entering into the cell and may prevent or substantially prevent any liquid from exiting through the mist elimination system. The hydrophobic filter may also be concave or dome-shaped to facilitate the roll-off of liquid from the exterior surface and to promote roll-off of any condensation on the interior surface.

FIG. 5 shows a block diagram of a mist elimination system. As shown, potassium hydroxide, (KOH), oxygen gas ($O_2$), as well as hydrogen gas, ($H_2$), may enter into the mist elimination system. A spill prevention device such as a safety valve, as shown, in FIGS. 6 and 7 prevents or substantially prevents liquid ionically conductive media from freely flowing out of the cell chamber. The safety valve prevents or substantially prevents liquid from passing out of the cell chamber through the safety valve in the event of an upset, such as the electrochemical cell being knocked over. Downstream of the safety valve is a filter for capturing any mist that may pass through the safety valve. Downstream of the filter is a recombination portion comprising a recombination catalyst that reacts with the hydrogen to form water. Oxygen may be available from the ambient environment for this reaction and may enter through the hydrophobic filter. Downstream of the recombination portion is a neutralizer portion that reacts with any remaining electrolyte, such as KOH, to neutralize it. KOH is a base and the neutralizer media may comprise an acid component that reacts with this exemplary base to neutralize it, wherein the reaction produce products that are not acidic or basic, having a pH of between 4 and 10, for example and preferably between 5 and 9. In the event that the electrolyte is an acid, the neutralizer media may comprise a base. Downstream of the neutralizer portion is a hydrophobic filter that prevents or substantially prevents water from the ambient environment from entering into the mist elimination system. The hydrophobic filter may also prevent or substantially prevent liquid, such as electrolyte, from escaping through the mist elimination system. It is to be understood that the neutralizer portion and recombination portion may be interchanged in terms of position. In addition, a recombination portion may be configured upstream of the filter and/or upset valve in some embodiments. It is preferred to protect the recombination portion from direct exposure to the liquid electrolyte however, as this may reduce the life and effectiveness of the recombination catalyst As shown in FIGS. 6 and 7, a spill prevention device 82 is a safety valve 300 having a ball 302 configured with a conduit 301 that floats or moves within the conduit to allow gas to pass around the ball from the inlet 305 to the outlet 306. The flow of gas up and around the ball may lift the ball to allow the gas to flow around the ball, as shown in FIG. 6. When a liquid enters the safety valve however, as shown in FIG. 7, the liquid will force the ball 302 up against sealing seat 304 to prevent or substantially prevent the liquid from passing out of the outlet 306. This safety valve is therefore self-regulating and is a spill prevention valve.

Figure 8:
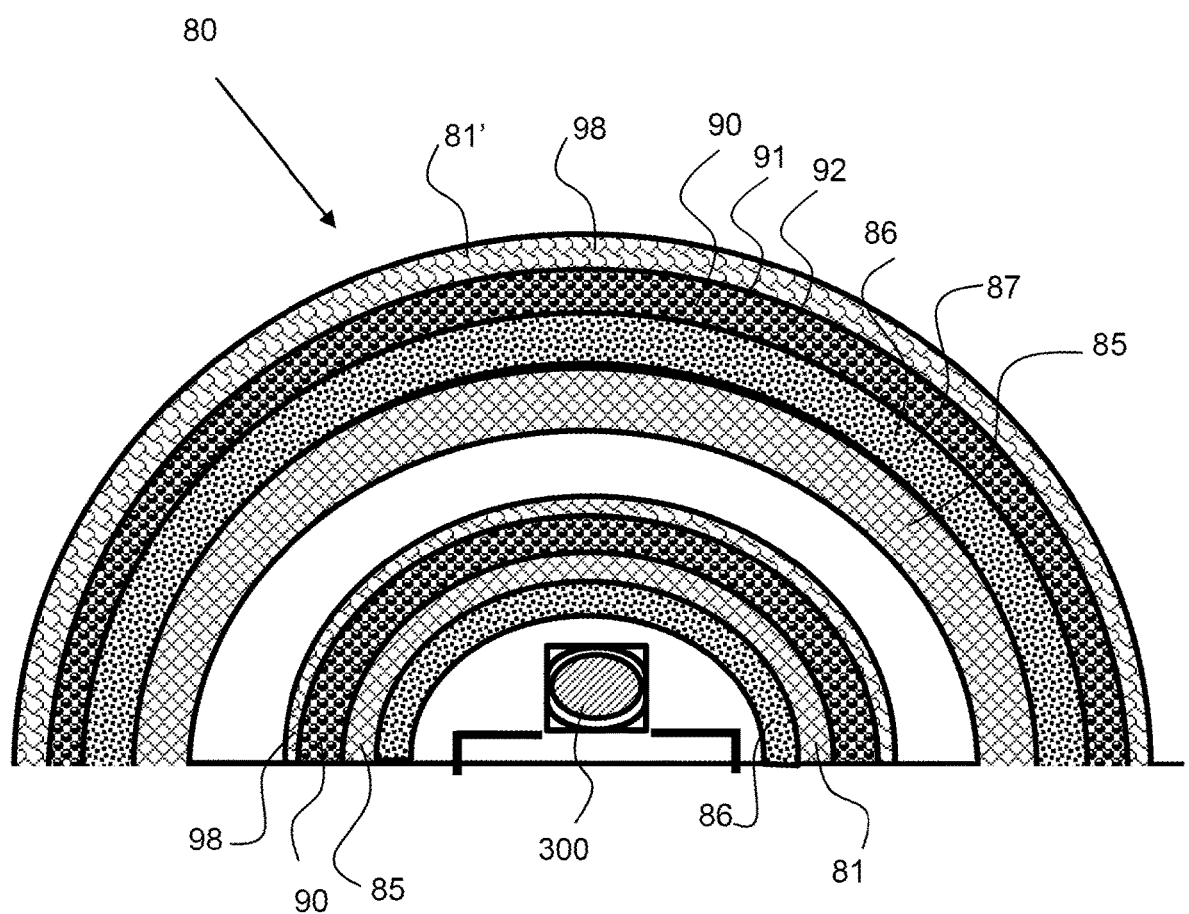
FIG. 8 shows a cross-sectional view of an exemplary mist elimination system comprising a first mist elimination stack and a second mist elimination stack.

As shown in FIG. 8, an exemplary mist elimination system 80 comprises a first mist elimination stack 81 and a second mist elimination stack 81'. A mist elimination stack comprises two or more components of a mist elimination system including, a spill prevention device, a recombination portion, a filter, a neutralize portion and a hydrophobic filter. The first mist elimination stack comprises a hydrogen recombination portion 86, a spill prevention device comprising a safety valve 300, a filter 85, a neutralizer portion 90 and a hydrophobic filter 98. There is a gap, or space between the first mist elimination stack 81 and second mist elimination stacks 81'. The second mist elimination stack 81' comprises a hydrogen recombination portion 86, a filter 85, a neutralizer portion 90 and a hydrophobic filter 98. The two layer mist elimination system better ensures that the exhaust from the cell chamber will have reduced moisture and will be neutralized. It should be appreciated that a mist elimination system may be constructed with fewer components. For example, in some embodiments, just a filter 85 may be used, or just a neutralizer 90 may be used. The number and type of mist elimination components used can be modified based on the application, use, and intended environment where the electrochemical cell will be used.

Figure 9:
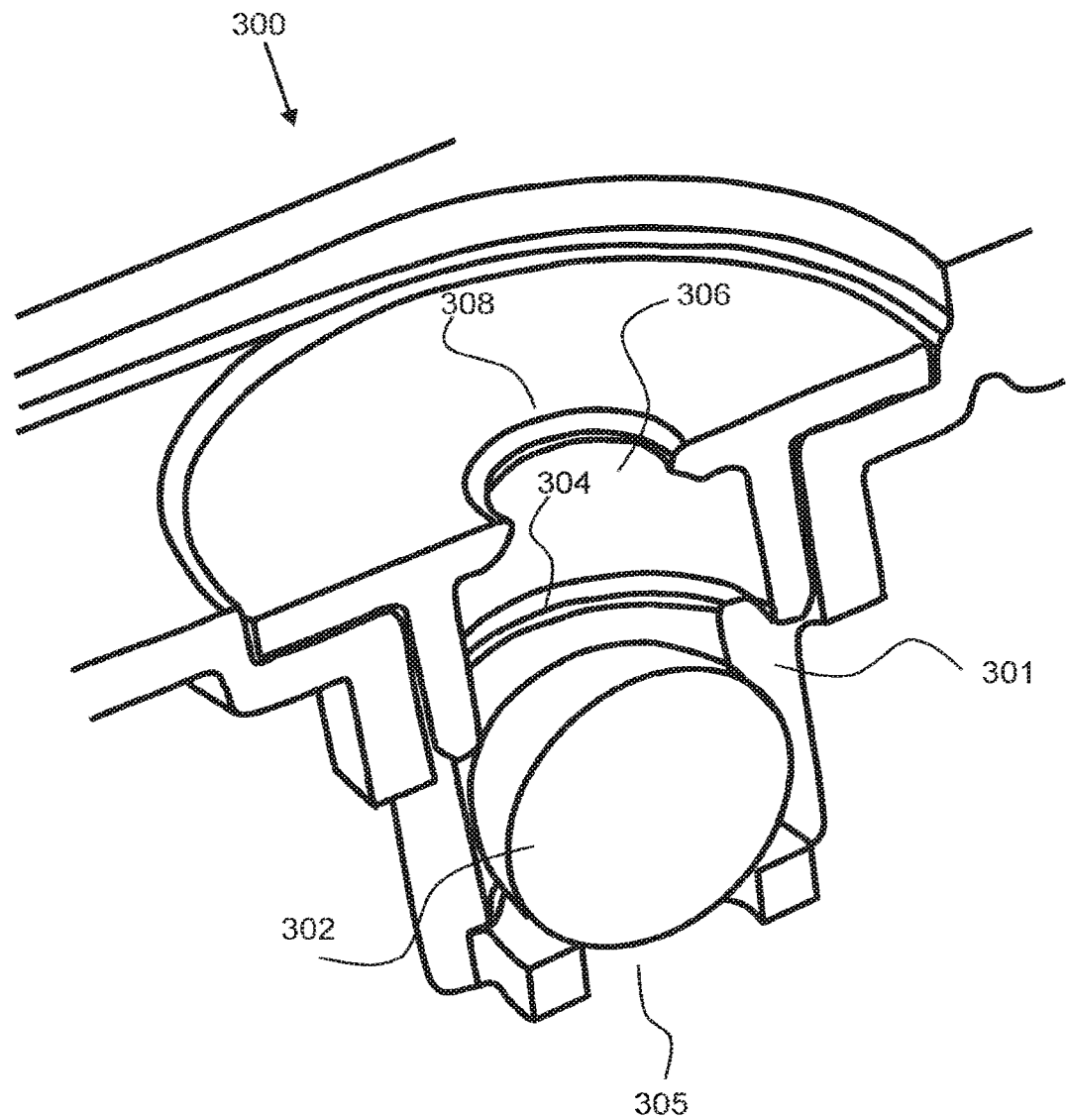
FIG. 9 shows a cross-section view of an exemplary safety valve having a ball within a conduit and a sealing seat on a downstream end of the conduit.

As shown in FIG. 9, an exemplary safety valve 300 has a ball 302 within a conduit 301 and a sealing seat 304 on a downstream end of the conduit. Fluid that condenses downstream 308 of the outlet 306 will flow down through the outlet opening, around the perimeter of the ball and through the inlet 305 back into the cell chamber, below the safety valve. Again, the ball will be forced against the sealing seat 304 and prevent (or substantially prevent) liquid from leaking from the cell chamber should the cell be tipped over.

Figure 10:
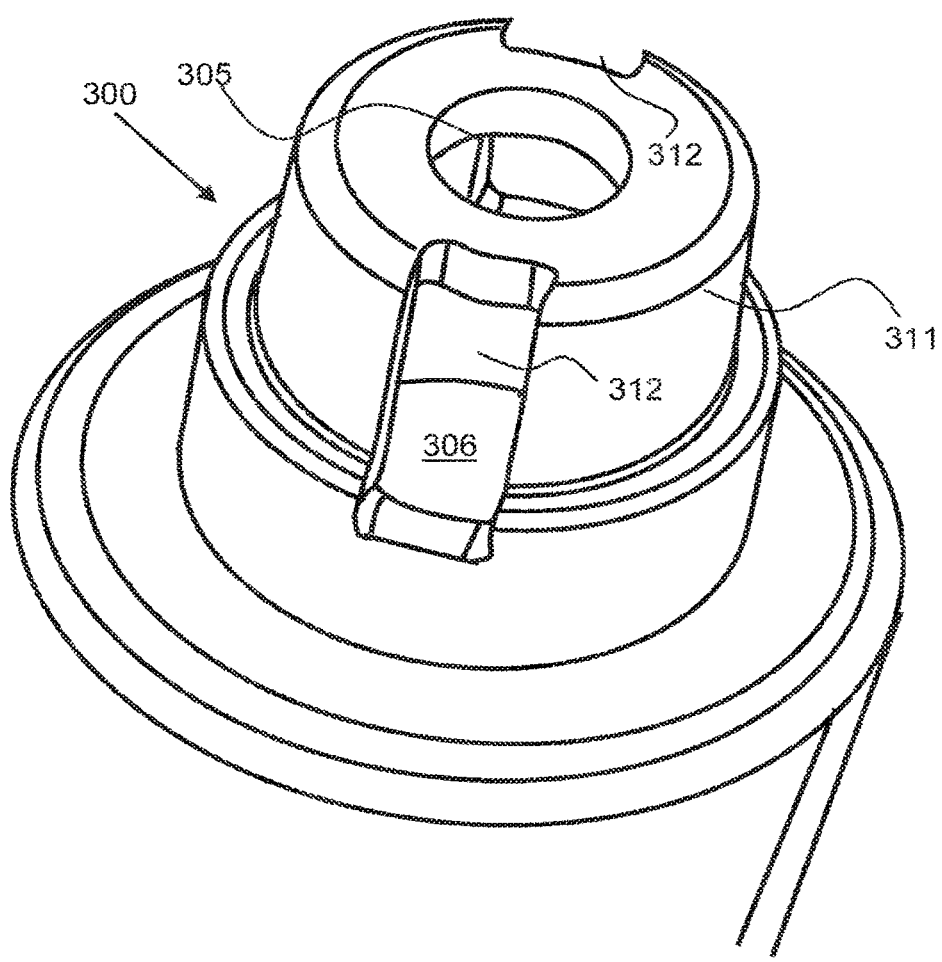
FIG. 10 shows a bottom, or inlet, view of an exemplary safety valve.

As shown in FIG. 10, an exemplary safety valve 300 has a barrel 311 for retaining the ball, not shown, and a plurality of slots 312, 312', or openings from the interior of the barrel to the exterior of the barrier to allow liquid to flow freely from the downstream side back into the cell chamber. The slots shown extend down along a portion of the length of the barrel. One, two or more slots or openings may be configured in the barrel to allow liquid to flow therethrough. The barrel is a cylindrical member for retaining the ball and allowing the ball to move up and down or along the interior of the barrel as required for ventilation or to seal the valve when there is an upset.

It will be apparent to those skilled in the art that various modifications, combinations and variations can be made in the present disclosure without departing from the spirit or scope of the disclosure. Specific embodiments, features and elements described herein may be modified, and/or combined in any suitable manner. Thus, it is intended that the present disclosure cover the modifications, combinations and variations of this disclosure provided they come within the scope of the appended claims and their equivalents.

What is claimed is:

1. An electrochemical cell comprising:
   a cell housing comprising:
   i) an air chamber;
   ii) an air chamber air inlet;
   iii) an air chamber air outlet;
   iv) an electrolyte chamber,
   an ionically conductive liquid electrolyte in the electrolyte chamber, wherein a gas space is defined in the electrolyte chamber above the liquid electrolyte, and wherein the gas space has a cell gas;
   an oxidant reduction electrode for reducing a gaseous oxidant between the air chamber and the electrolyte chamber,
   a fuel electrode comprising a metal fuel at least partially within the electrolyte chamber; and
   a mist elimination system between the electrolyte chamber and an exhaust vent to separate the cell gas from a mist comprising the ionically conductive liquid electrolyte wherein the mist elimination system is above the ionically conductive liquid electrolyte, and wherein the mist elimination system comprises:
a spill prevention device;
a first mist elimination stack downstream of the spill prevention device, the first mist elimination stack comprising:
a hydrogen recombination portion comprising a hydrogen recombination catalyst configured to react with hydrogen gas within the cell gas and form water;
a filter body portion comprising at least one layer of filter media for capturing the mist, the at least one layer of filter media defining pores permeable by the cell gas; and
a neutralizer portion comprising a neutralizer media configured to react with and neutralize the ionically conductive liquid electrolyte contained within the mist;
wherein the neutralizer portion is downstream of the filter body portion.

2. The electrochemical cell of claim 1, wherein the hydrogen recombination portion is configured downstream of the filter body portion.

3. The electrochemical cell of claim 1, wherein the hydrogen recombination portion is configured upstream of the filter body portion and downstream the spill prevention device.

4. The electrochemical cell of claim 1, the mist elimination system further comprising:
a second mist elimination stack downstream of the spill prevention device, the second mist elimination stack comprising:
a second hydrogen recombination portion comprising a hydrogen recombination catalyst configured to react with hydrogen gas within the cell gas and form water;
a second filter body portion comprising at least one layer of filter media for capturing the mist, the at least one layer defining pores permeable to the cell gas; and
a second neutralizer portion comprising a neutralizer media configured to react with and neutralize the ionically conductive liquid electrolyte contained within the mist.

5. The electrochemical cell of claim 4, wherein the second mist elimination stack is stacked over the first mist elimination stack.

6. The electrochemical cell of claim 1, wherein the spill prevention device comprises a tortuous path conduit, from an inlet to an outlet, for transferring cell gas therethrough; wherein the inlet of the tortuous path conduit faces the electrolyte chamber for receiving cell gas.

7. The electrochemical cell of claim 1, wherein the spill prevention device comprises a safety valve.

8. The electrochemical cell of claim 7, wherein the safety valve comprises a ball retained within a conduit having a sealing seat on a downstream side, wherein the ball is pressed against the sealing seat to prevent liquid passage through the safety valve when liquid enters the conduit.

9. The electrochemical cell of claim 1, wherein the filter body portion is formed in a concave shape with an apex directed upwardly in an upright orientation of the cell, and body surface extending downwardly from the apex so as to drain absorbed ionically conductive medium back into the electrolyte chamber.

10. The electrochemical cell of claim 1, wherein water from reaction of hydrogen with the hydrogen recombination catalyst is introducible back into the cell through the spill prevention device.

11. The electrochemical cell of claim 1, wherein the hydrogen recombination catalyst is selected from the group consisting of:
perovskites, spinels, precious metal based platinum, palladium, $MnO_2$, Nickel, and a combination thereof.

12. The electrochemical cell of claim 1, wherein the neutralizer media comprises a solid acid.

13. The electrochemical cell of claim 1, wherein the neutralizer media comprises an acid component being selected from the group consisting of:
citric acid, oxalic acid, carboxylic acid, sulfamic acid, benzoic acid, boric acid, sulfuric acid, hydrochloric acid, and nitric acid.

14. The electrochemical cell of claim 1, wherein the mist elimination system further comprises a hydrophobic filter configured downstream of the neutralizer portion on an exhaust end of the mist elimination system.

15. The electrochemical cell of claim 14, wherein the hydrophobic filter comprises a fluoropolymer filter media.

16. The electrochemical cell of claim 14, wherein the hydrophobic filter comprises an expanded microporous fluoropolymer filter media.

17. The electrochemical cell to of claim 1, wherein:
the spill prevention device comprises a safety valve comprising:
a ball retained within a conduit; and
a sealing seat on a downstream side of the conduit, wherein the ball is pressed against the sealing seat to prevent liquid passage through the safety valve when liquid enters the conduit; and
the mist elimination system further comprises:
a hydrophobic filter at an exhaust end of the mist elimination system;
wherein the hydrophobic filter is on an exterior of the mist elimination system and configured downstream of the neutralizer portion and is on an exterior of a mist elimination system.

18. The electrochemical cell of claim 1, wherein the fuel electrode is positioned apart from the oxidant reduction electrode, thereby defining a gap,
wherein the ionically conductive liquid electrolyte is in the gap.

* * * * *